(12) United States Patent
Westling et al.

(10) Patent No.: US 11,933,480 B2
(45) Date of Patent: Mar. 19, 2024

(54) PORTABLE LIGHTING SYSTEMS

(71) Applicant: MILWAUKEE ELECTRIC TOOL CORPORATION, Brookfield, WI (US)

(72) Inventors: Bennett W. Westling, Milwaukee, WI (US); Christopher S. Spaulding, Green Bay, WI (US); Scott T. Moeller, Richfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 201 days.

(21) Appl. No.: 17/484,785

(22) Filed: Sep. 24, 2021

(65) Prior Publication Data

US 2022/0090768 A1 Mar. 24, 2022

Related U.S. Application Data

(60) Provisional application No. 63/158,072, filed on Mar. 8, 2021, provisional application No. 63/109,506, filed on Nov. 4, 2020, provisional application No. 63/082,794, filed on Sep. 24, 2020.

(51) Int. Cl.
*F21V 19/02* (2006.01)
*F21S 9/02* (2006.01)

(52) U.S. Cl.
CPC .............. *F21V 19/02* (2013.01); *F21S 9/02* (2013.01)

(58) Field of Classification Search
CPC ... F21V 21/0965; F21V 21/08; F21V 21/0885
See application file for complete search history.

(56) References Cited

U.S. PATENT DOCUMENTS

| | | | |
|---|---|---|---|
| 7,470,055 B2 * | 12/2008 | Hacker | F21V 21/005 362/225 |
| 9,638,379 B2 * | 5/2017 | Sun | F21V 21/08 |
| 9,711,765 B1 * | 7/2017 | Ladd | H01M 10/488 |
| 10,962,218 B2 | 3/2021 | Plato et al. | |
| 2005/0018435 A1 | 1/2005 | Selkee et al. | |
| 2010/0073922 A1 * | 3/2010 | Yen | F21V 7/0008 362/205 |
| 2011/0169451 A1 | 7/2011 | Stampfli | |
| 2016/0338212 A1 * | 11/2016 | Schmidt | G08B 17/113 |
| 2017/0167700 A1 * | 6/2017 | Dorman | F21S 8/003 |

(Continued)

FOREIGN PATENT DOCUMENTS

CN 106493698 A * 3/2017

OTHER PUBLICATIONS

English translation of Hu CN-106493698-A, published Mar. 2017 (Year: 2017).*

(Continued)

*Primary Examiner* — Evan P Dzierzynski
(74) *Attorney, Agent, or Firm* — Michael Best & Friedrich LLP

(57) ABSTRACT

A portable lighting system includes a housing with a lower surface, walls extending from the lower surface, and a cavity defined by the lower surface and the walls. The cavity is divided into a first space and a second space. A light body is coupled to the housing for movement between a first position, in which the light body encloses the first space, and a second position, in which the light body allows access to the first space. A battery is removably received in the second space.

8 Claims, 30 Drawing Sheets

(56) References Cited

U.S. PATENT DOCUMENTS

| | | |
|---|---|---|
| 2017/0234525 A1 | 8/2017 | Cate |
| 2018/0306419 A1 | 10/2018 | Dorman et al. |
| 2019/0170307 A1 | 6/2019 | Worman et al. |
| 2021/0172595 A1 | 6/2021 | Plato et al. |

OTHER PUBLICATIONS

Milwaukee Electric Tool Corp., "M18™ PACKOUT™ Light/Charger," <https://www.milwaukeetool.com/Products/Lighting/Task-Lighting/2357-20> web page visited Sep. 28, 2021.
International Search Report and Written Opinion for Application No. PCT/US2021/052010 dated Jan. 10, 2022 (10 pages).

* cited by examiner

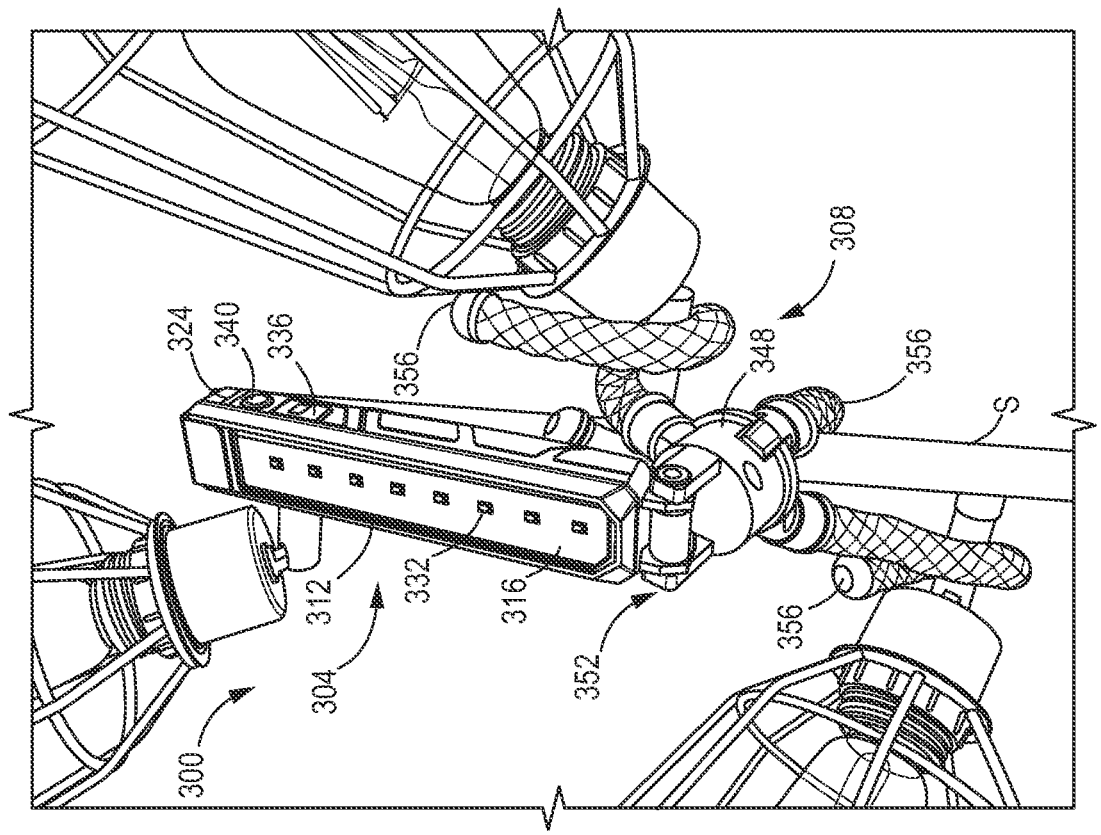
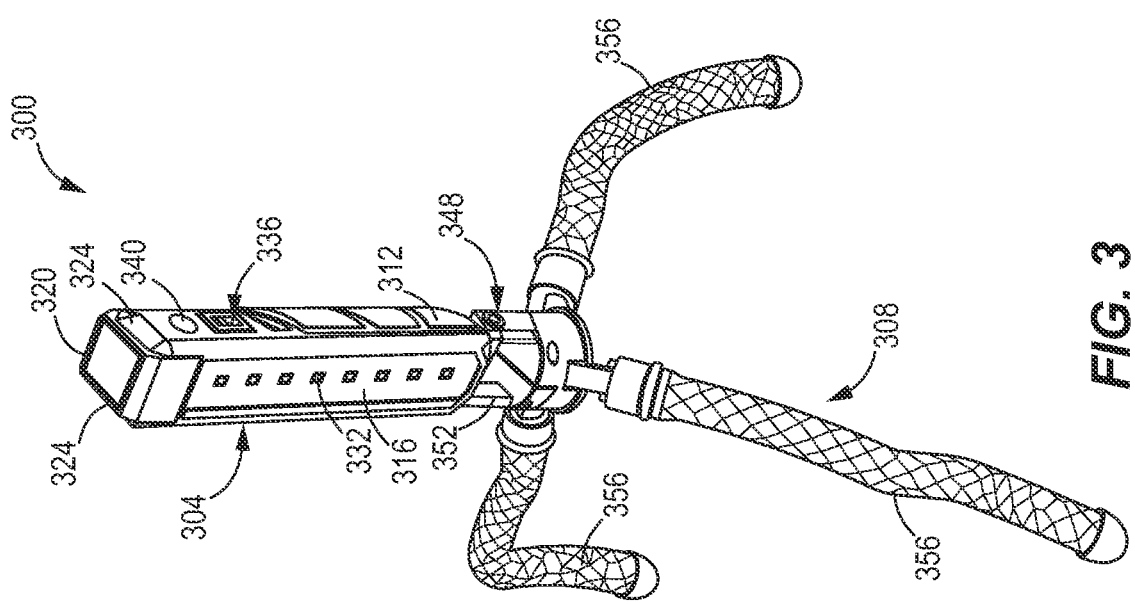

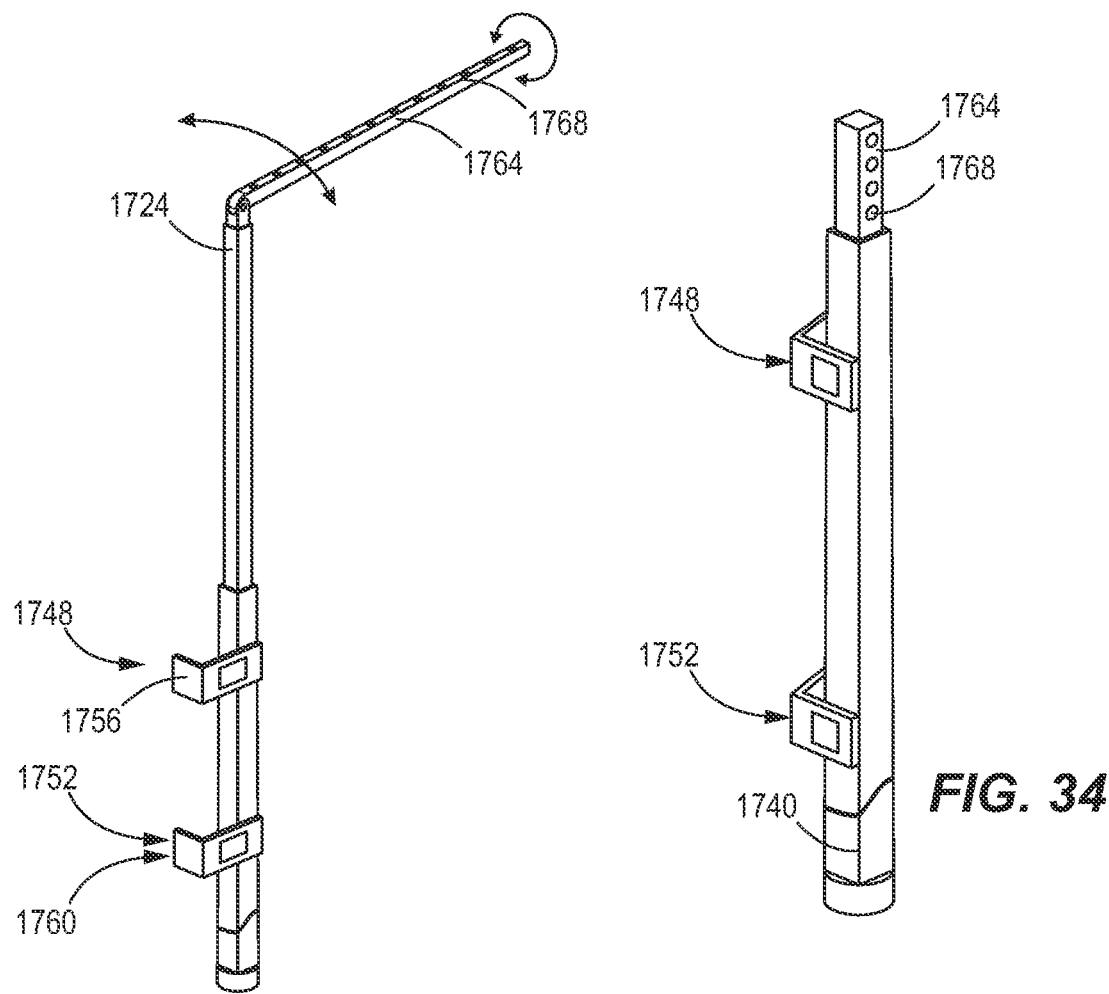
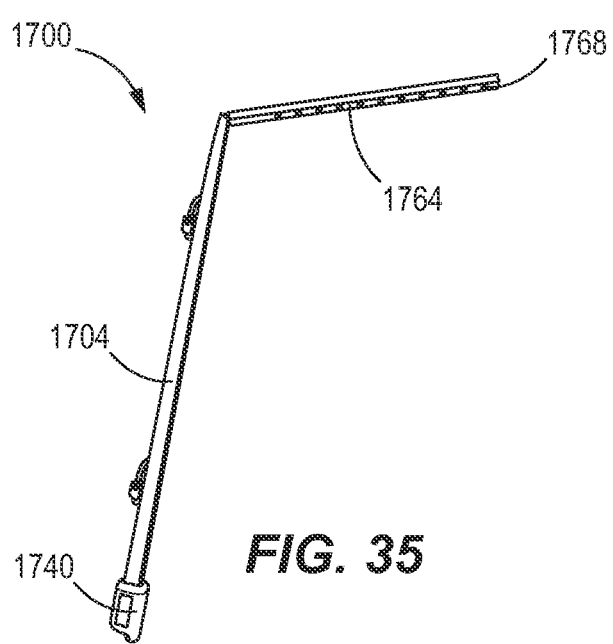
FIG. 33
FIG. 34
FIG. 35

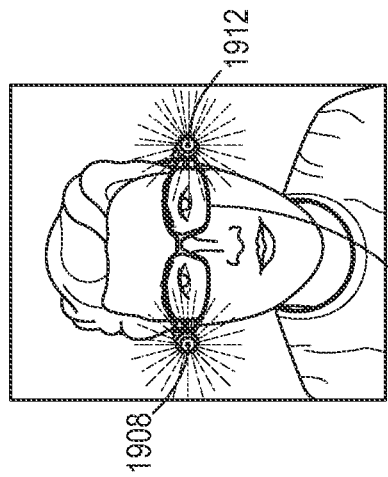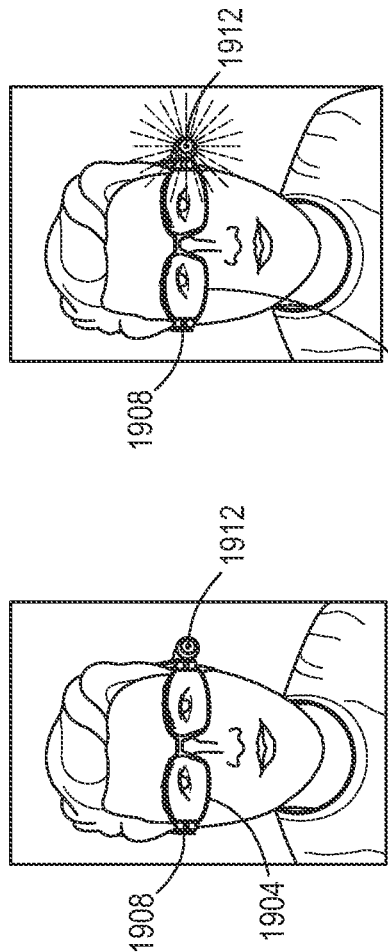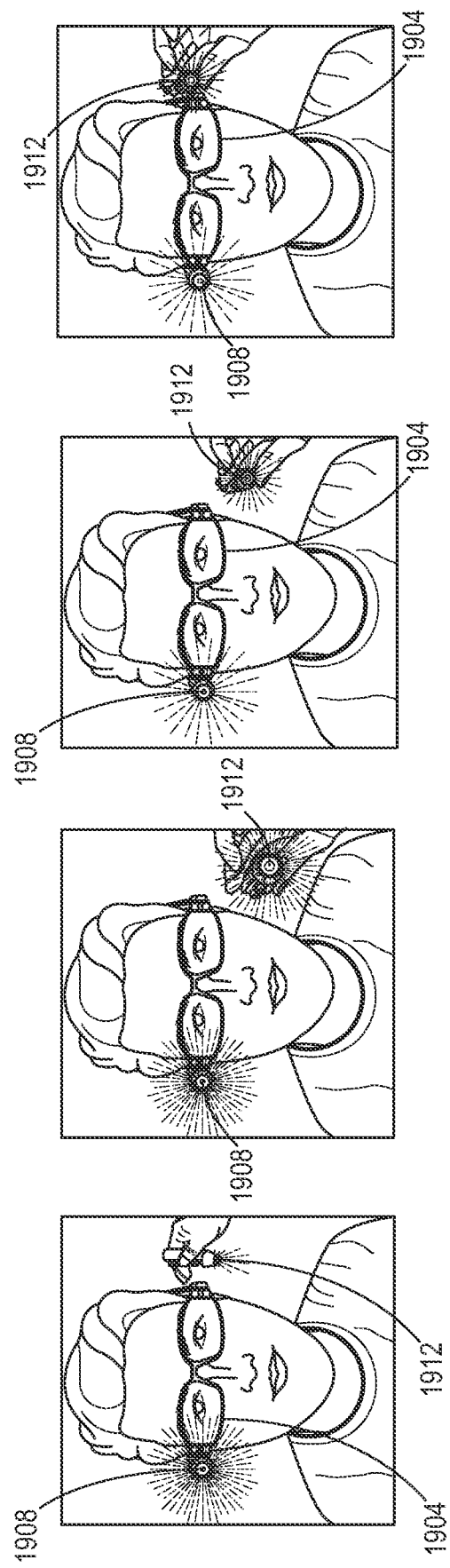

PORTABLE LIGHTING SYSTEMS

CROSS-REFERENCE TO RELATED APPLICATIONS

This application claims priority to U.S. Provisional Application No. 63/158,072, filed Mar. 8, 2021, U.S. Provisional Application No. 63/109,506, filed Nov. 4, 2020, and U.S. Provisional Application No. 63/082,794, filed Sep. 24, 2020. The entire contents of each are hereby incorporated by reference herein.

FIELD OF THE INVENTION

The present invention relates to portable lighting systems.

SUMMARY

In one independent embodiment, the disclosure provides a portable lighting system including a housing with a lower surface, walls extending from the lower surface, and a cavity defined by the lower surface and the walls. The cavity is divided into a first space and a second space. A light body is coupled to the housing for movement between a first position, in which the light body encloses the first space, and a second position, in which the light body allows access to the first space. A battery is removably received in the second space.

In another independent embodiment, the disclosure provides a portable lighting system including a case having a housing. The housing includes a lower surface, walls extending from the lower surface, and a cavity defined by the lower surface and the walls. A light body is supported by the case and a battery mount is movably mounted in the cavity. A battery is removably coupled to the battery mount. The battery mount is movable between a first position, in which the battery is able to be removed from the battery mount, and a second position in which the battery is inhibited from being removed from the battery mount.

In another independent embodiment, the disclosure provides a storage and lighting system including a case having a primary interface. The case includes a housing defining a receiving area, a light body supported by the housing adjacent the receiving area, and a battery removably received in the receiving area. The housing defines a first part of the primary interface. The light body defines a second part of the primary interface that is spaced from the first part of the primary interface. The first part of the primary interface has a complementary configuration to the second part of the primary interface such that the case can be removably coupled to a similar style of case at the first part of the primary interface or at the second part of the primary interface.

Other aspects of the invention will become apparent by consideration of the detailed description and accompanying drawings.

BRIEF DESCRIPTION OF THE DRAWINGS

FIG. 3 is a perspective view of a portable task light in a standing configuration.

FIG. 4 is a perspective view of the portable task light of FIG. 3 in a hanging configuration.

FIG. 33 is a perspective view of another portable pole light in an extended position.

FIG. 34 is a perspective view of the portable pole light of FIG. 33 in a retracted position.

FIG. 35 is a side view of the portable pole light of FIG. 33.

FIG. 38A-G are front views of a user operating the portable eyewear light of FIG. 36 and different usage positions thereof.

Before any embodiments of the disclosure are explained in detail, it is to be understood that the disclosure is not limited in its application to the details of construction and the arrangement of components set forth in the following description or illustrated in the following drawings. The subject matter is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

DETAILED DESCRIPTION

Figure 1:
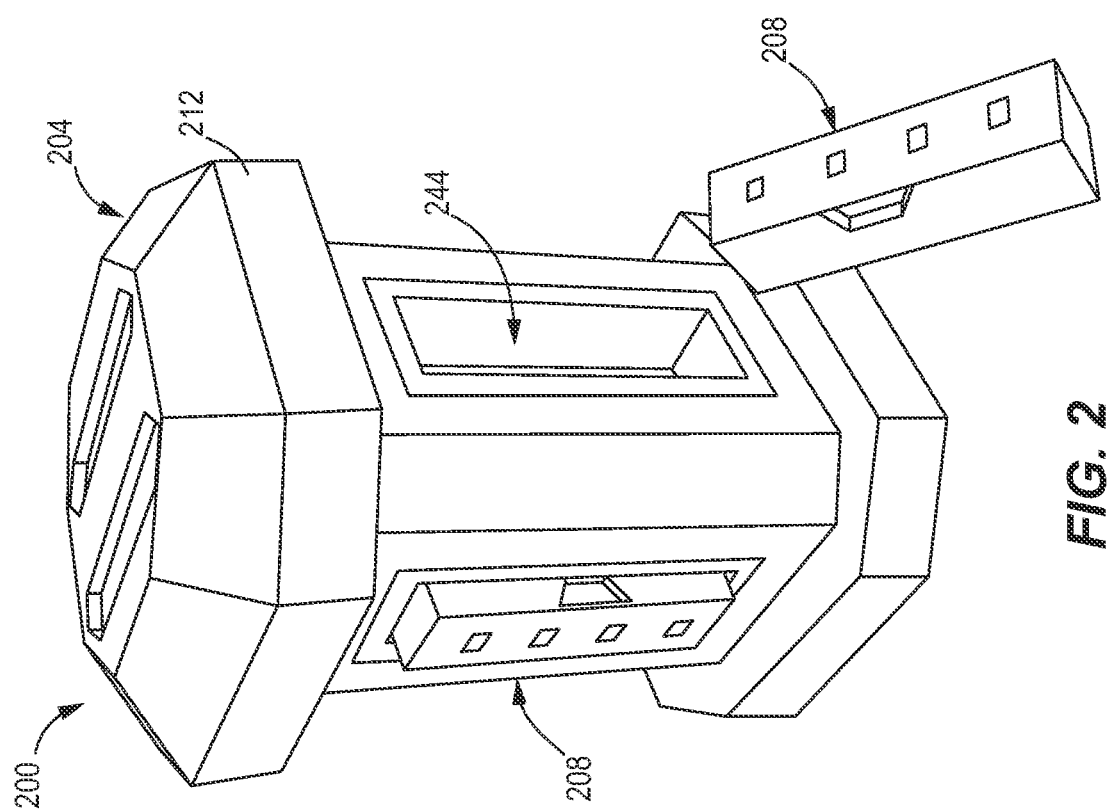
FIG. 1 is a perspective view of a portable area light including a first removable task light in a disconnected state and a second removable task light in a connected state.
Figure 55:
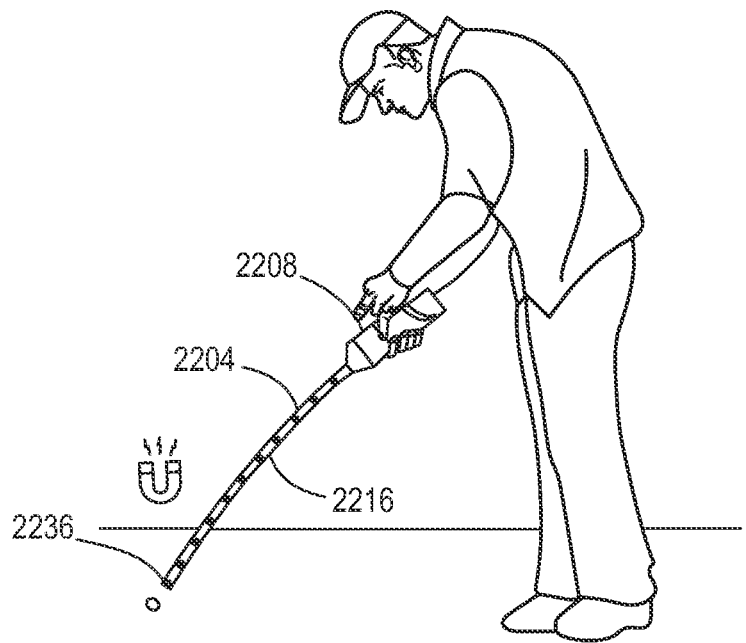
FIG. 55 is a schematic view of the portable rope light of FIG. 49 in a fourth use situation.

FIGS. 1-55 illustrate a plurality of portable lights or lighting systems. Each portable light or lighting system may include a power source. In some embodiments, the power source may be a rechargeable battery. In some embodiments, the battery may be removable and may be charged using a charging apparatus separate from the lighting system. In some embodiments, the battery may be integrated into the lighting system and may be recharged using external power transmitted through a charging circuit. The charging circuit may include a charging port. The charging port may utilize RLUSB connections or may utilize other standard charging port configurations. In other embodiments, the lighting systems may be powered by non-rechargeable batteries or by a wired connection to an external power source.

Each light or lighting system may also include a light source. The light source may include one or more light emitting diodes (LEDs). In some embodiments, the light source may instead include one or more incandescent lights, fluorescent lights, halogen lights, or other lighting elements. The light source may further include a lens to protect the light source and other lighting elements.

Each light or lighting system may include one or more switches. The switch may be electrically connected to the power source and the light source in order to selectively power the light source. In some embodiments the switch may be a push button switch. In other embodiments, the switch may be a slide switch, a rotary switch, and the like. The switch may control the output of the light source between an ON state and an OFF state. In some embodiments, additional states may be included such as high, medium, low, flash, and others.

Each light or lighting system may include additional features and may not include the features discussed above. However, the above are contemplated as alternatives for each light or lighting system disclosed below. Additionally, each light or lighting system may disclose features that may be used in combination with other lights or lighting systems disclosed herein.

FIG. 1 illustrates a first portable lighting system 100. The portable lighting system 100 includes a main hub 104 and a plurality of removable task lights 108a, 108b. The main hub 104 may include a main housing 112 having a base portion 116, a lantern portion 120 disposed above the base portion 116, and a handle 124 disposed above the lantern portion 120. The base portion 116 is opaque and contains a power source and a switch. The power source may be a removable rechargeable battery. The lantern portion 120 is formed from translucent or transparent plastic and contains a light source. The light source may include one or more LEDs. The light source is electrically connected to the battery through the switch, such that the switch may selectively turn the light source on and off or switch modes. The lantern portion 120 may contain optics to diffuse the light emitted by the light source to provide even lighting to an area around the main hub 104. Additionally, the translucent plastic of the lantern portion 120 may act as a diffuser to spread the light and reduce glare.

The lantern portion 120 includes receiving areas 144 for removably supporting the removable lights 108a, 108b. In the illustrated embodiment, the lantern portion 120 includes two receiving areas 144 for removably supporting two removable lights 108a, 108b. In other embodiments, the lantern portion 120 may include fewer or more receiving areas 144. In the illustrated embodiment, the first removable light 108a may be similarly formed or identical to the second removable light 108b. In some embodiments, the first and second removable lights 108a, 108b may be formed different from each other. In the illustrated embodiment, the receiving areas 144 may be shaped to receive the removable lights 108a, 108b in horizontal orientations, and the receiving areas 144 are all positioned on a front of the main hub 104. In some embodiments, the removable lights 108a, 108b may be received in non-horizontal orientation and may be positioned anywhere on the main hub 104.

Each receiving area 144 may include a mounting feature 148 to retain the associated removable light 108a, 108b therein. In the illustrated embodiment, the mounting feature 148 may include a depression 152 having a pair of opposing surfaces 156. In some embodiments, the mounting feature 148 may include magnets, clamps, or other appropriate mounting devices.

Each receiving area 144 may also include electrical contacts. The electrical contacts may connect to the removable lights 108a, 108b when the removable lights 108a, 108b are received in the receiving areas 144, and the lantern portion 120 may additionally contain charging electronics for charging the removable lights 108, 108b from the power source. In some embodiments, the charging electronics of the lantern portion 120 may include induction charging circuits for charging the removable lights 108a, 108b.

Each removable light 108a, 108b may include a light housing 160a, 160b having a transparent front surface 164a, 164b and a rear surface 168a, 168b connected by two side surfaces 172a, 172b. The housing 160a, 160b contains a light source 170a, 170b disposed adjacent the transparent front surface 164a, 164a. The housing 160a, 160b also contains a rechargeable battery and charging electronics. In some embodiments, the charging electronics may include electrical contacts on the rear surface 168a, 168b to interface with the electrical contacts in the receiving area 144. In other embodiments, the charging electronics may include induction charging circuits. Each removable light 108a, 108b may also include a charging port for charging the removable light 108a, 108b separate from the main hub 104. The charging port may be a USB port. Each removable light 108a, 108b may further include a switch. The switch 188 may be operable to selectively turn the light source 170 on and off or change modes.

The first removable light 108a is illustrated in a connected position on the main hub 104. In this position, the side surfaces 172a of the removable light 108a contact the opposing surfaces 156 of the receiving area 144 to couple the removable light 108a to the main hub 104. The charging electronics positioned in the removable light 108a connect with the charging electronics in the lantern portion 120 of the main hub 104. To disconnect the removable light 108a from the main 104, a user grips a portion of the light housing 160a and pulls away from the main hub 104.

The second removable light 108b is illustrated in a disconnected position from the main hub 104. In this position, the removable light 108b may be supported on a flat surface by a bottom face of the housing 160b. The switch on the removable light 108b may be used to control the light source 170b. The light emitted from the light source 170b may be used to illuminate an area remote from the main hub 104 or may be used to add additional illumination to an area adjacent the main hub 104. The main hub 104 may act as an area light, and the removable lights 108 may act as task lights or flash lights when removed from the main hub 104.

Figure 2:
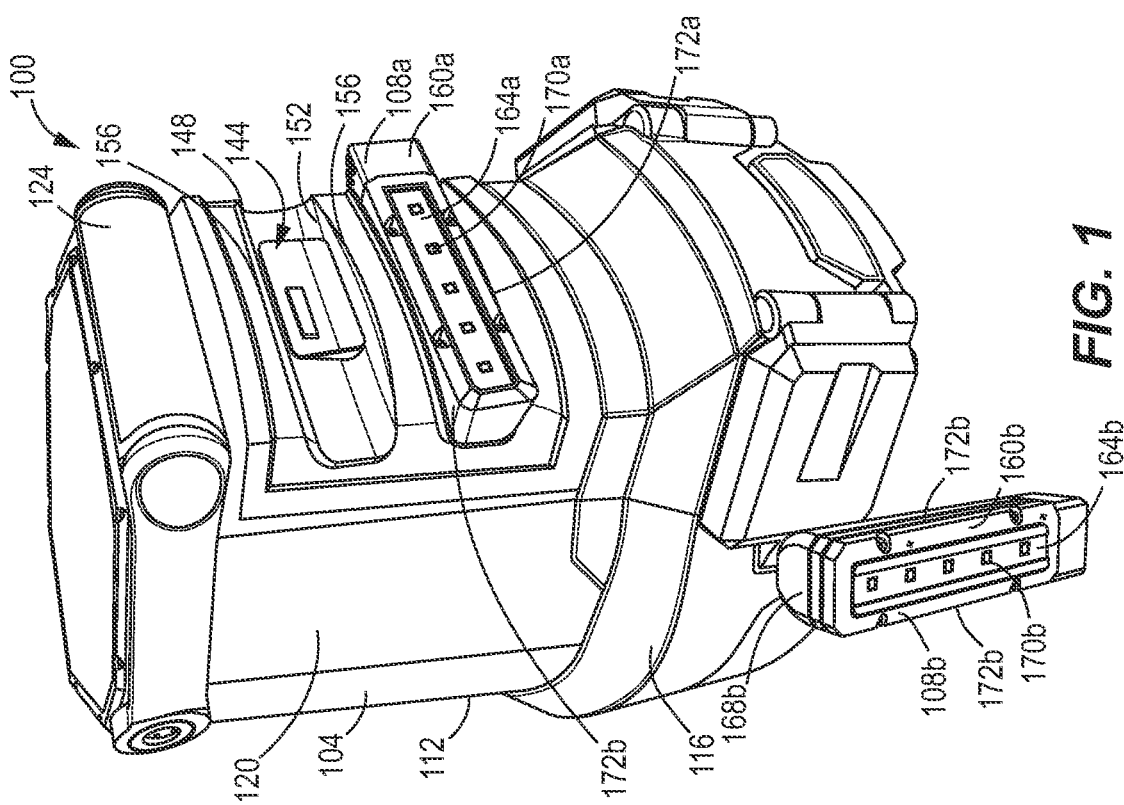
FIG. 2 is a perspective view of another portable area light including a first removable task light in a disconnected state and a second removable task light in a connected state.

FIG. 2 illustrates a second portable lighting system 200. The portable lighting system 200 is similar to the portable lighting system 100 of FIGS. 1-2, and similar features are denoted using the same reference numbers plus 100. The portable lighting system 200 includes a main hub 204 having a main housing 212. The main housing 212 of the main hub 204 defines receiving areas 244 that are shaped to receive removable lights 208 in a vertical orientation. In the illustrated embodiment, the removable lights 208 are oriented parallel to main surfaces of the main housing 212. In other embodiments, the removable lights 208 may be oriented perpendicular to the main surfaces of the main housing 212. The receiving areas 244 are spaced equally around the main hub 204. In some embodiments, the main hub 204 may include a light source. In other embodiments, the main hub 204 may not include a light source, and area lighting may instead by created by the combined illumination of the removable lights 208. In further embodiments, the main hub 204 may be omitted, and the removable lights 208 may couple directly together to create an area light.

In some embodiments, the portable lighting system 200 may be adapted for use on top of a tripod or other support stand. In some embodiments, the main hub 204 may be shaped as a panel light, and the removable lights 208 may be attached to the panel light.

FIGS. 3-4 illustrate a third portable lighting system 300. The portable lighting system 300 may include a task light 304 and a mounting structure 308. The task light 304 may include an elongated light body 312 having a transparent front surface 316 and a rear surface 320 connected by two side surfaces 324. The light body 312 contains a power source and a light source 332 disposed adjacent the front surface 316. The power source may be a rechargeable battery. The light body 312 may further include a charging port 336 and a switch 340 for selectively powering the light source 332. In the illustrated embodiment, the charging port 336 and switch 340 are disposed on a side surface 324 of the light body 312. In some embodiments, the charging port 336 and the switch 340 may be disposed on the rear surface 320, or on any other portion of the light body 312. The light body 312 may include a base 348 disposed at a bottom of the light body 312. The base 348 may include an attachment mechanism 352 connecting the task light 304 to the mounting structure 308. The attachment mechanism 352 may include a swivel joint and a hinge. In some embodiments, the attachment mechanism 352 may include a ball socket joint or other spherical joint.

The mounting structure 308 may include a plurality of legs 356. The legs 356 are pliable such that they may be formed into a shape and may hold that shape until formed again. The legs 356 may be positioned in a standing position (FIG. 3) to support the task light 304 on a flat surface. The legs 356 may also be positioned in a hanging position (FIG. 4) by wrapping the legs 356 around an environmental support S. Once the mounting structure 308 has been shaped, the task light 304 may be adjusted using the attachment mechanism 352 to direct the light emitting from the light body 312.

The lighting system 300 may be used to provide light in a workspace. The lighting system 300 may be sized to be easily stored and transported. The attachment mechanism 352 and the legs 356 allow the light to be positioned and directed as needed in a variety of environments and workspaces.

Figure 5:
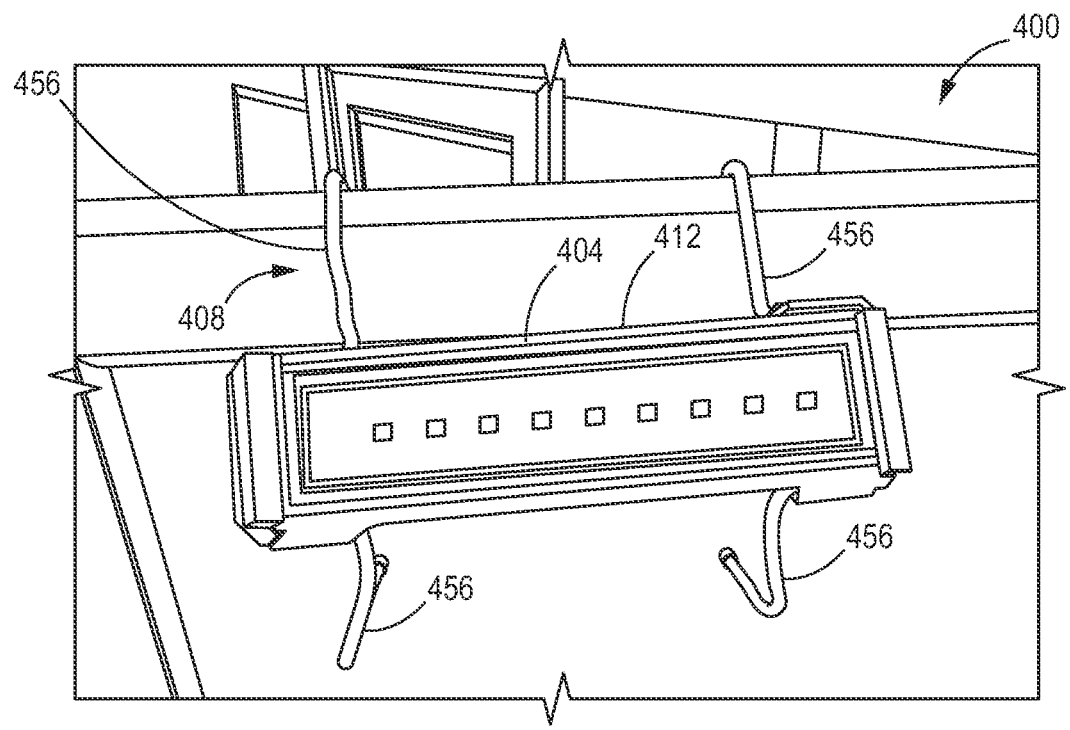
FIG. 5 is a perspective view of another portable task light.

FIG. 5 illustrates a fourth portable lighting system 400. The portable lighting system 400 is similar to the lighting system 300 shown in FIGS. 3-4, and similar features are denoted using the same reference numbers plus 100. The lighting system 400 may include a task light 404 with a light body 412 and a mounting structure 408 having a plurality of legs 456. The plurality of legs 456 are directly connected to the task light 404 at different locations along a length of the light body 412. In the illustrated embodiment, the legs 456 are connected at each end of the light body 412. In other embodiments, the legs 456 may be connected at other places on the light body 412. The legs 456 may be used to support the task light 404 on a flat surface or on an environmental support. The lighting system 400 provides easy storage and transport as well as highly adjustable illumination.

Figure 6:
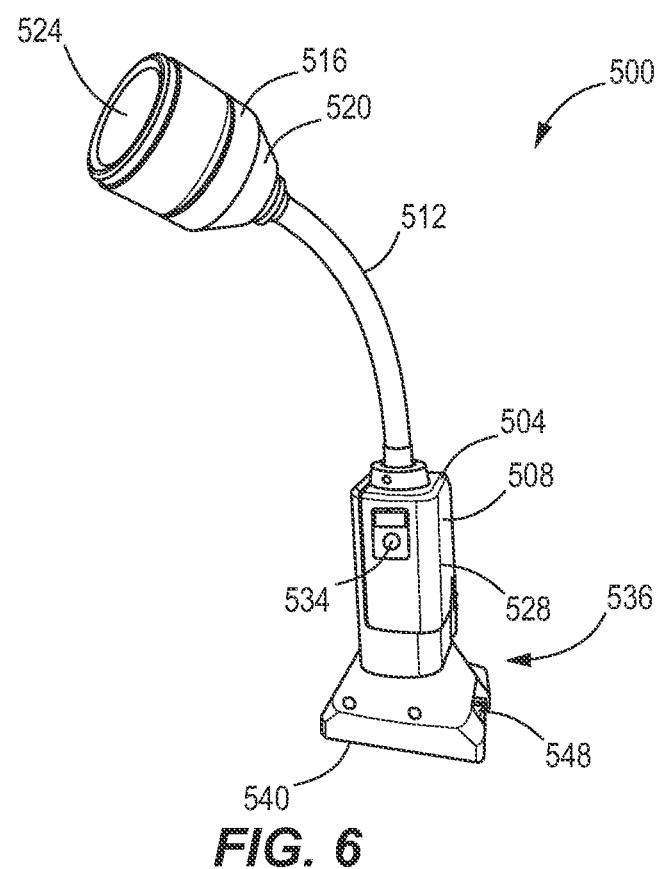
FIG. 6 is a perspective view of a portable lamp with a light head pointing generally upwards.
Figure 7:
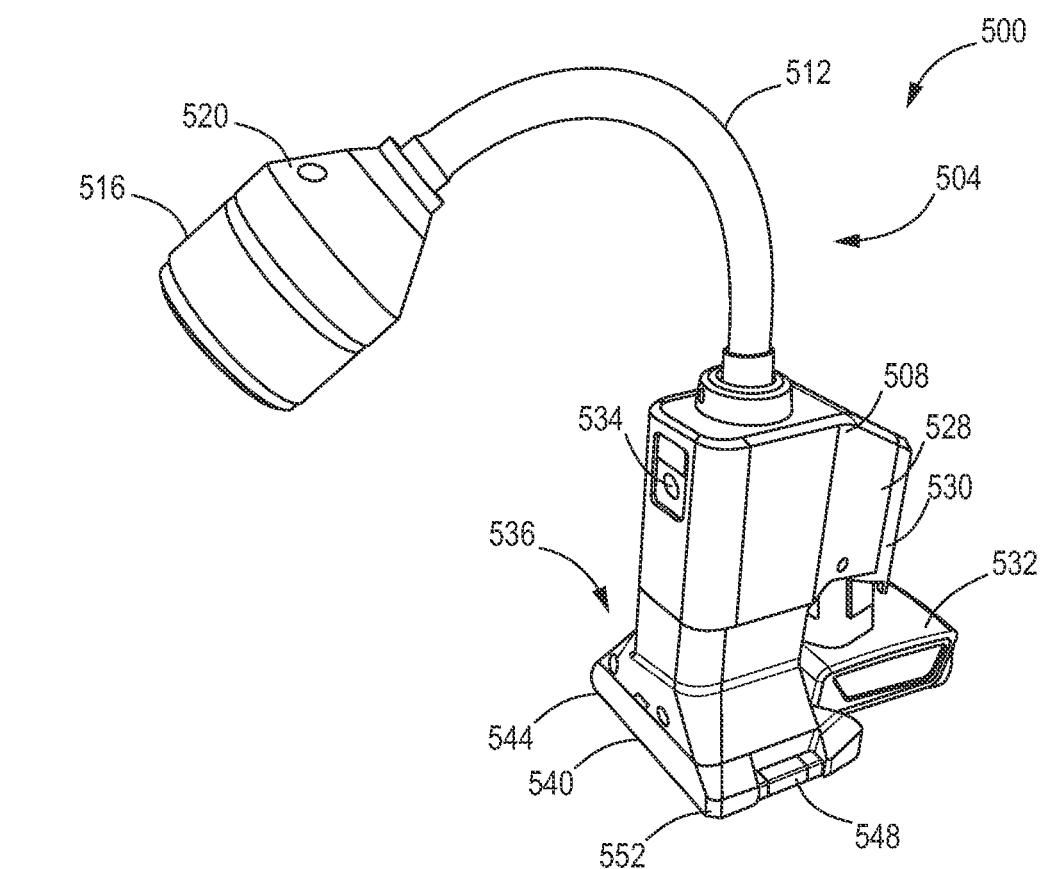
FIG. 7 is a perspective view of the portable lamp of FIG. 6 with the light head pointing generally downwards.

FIGS. 6-7 illustrate a fifth portable light system 500. The lighting system 500 may include a compact and portable lamp 504 with a mounting base 508, a neck 512, and a light head 516. The light head 516 may be electrically and mechanically connected to the mounting base 508 by the neck 512. The light head 516 may include a housing 520 containing a light source 524. The housing 520 is shaped and may include optics such that the light emitted from the light source 524 is channeled to provide illumination in one direction.

The neck 512 may be pliable to position the light head 516 with respect to the base 508. In FIG. 6, the neck 512 is positioned such that the light head 516 emits light generally upwardly. In FIG. 7, the neck 512 is positioned such that the light head 516 emits light generally downwardly.

The base 508 may include a housing 528 containing a removable rechargeable battery 532, a switch 534, and one or more mounting features 536. The battery 532 may be mounted in a battery receiving area 530 at a rear of the housing 528. The switch 534 may be electrically connected to the battery 532 and the light source 524 such that the switch 534 may selectively power the light source 524 to provide illumination. The mounting features 536 may include a support surface 540 for supporting the lamp 504 on a flat surface like a tabletop. The battery 532 may be slidingly installed in the battery receiving area 530 so that a lower surface of the battery is generally aligned with the support surface 540. The mounting features 536 may further include rubberized portions 552 disposed on or near the support surface 540 to inhibit sliding. The support surface 540 may include magnets 544 configured to couple the base 508 to ferromagnetic surfaces. The mounting features 536 may also include a spring clamp 548 for supporting the lamp 504 on thin surfaces (e.g. sheet metal, cupboard doors, two by fours).

The lighting system 500 may be light weight and compact in order to be easily transported to a workspace. The lighting system 500 may then be coupled to an appropriate support using one of the mounting features 536. For example, the lighting system 500 may be supported on a tabletop or other generally horizontal surface by the support surface 540. The lighting system 500 could also be coupled to a ferromagnetic surface by the magnets 544. The lighting system 500 could also be coupled to a thin support by the spring clamp 548. The light source 524 may be activated via the switch 534, and the illumination may be directed by positioning the light head 516 using the neck 512. In this way, the lighting system 500 may provide desirable illumination to a workspace.

Figure 8:
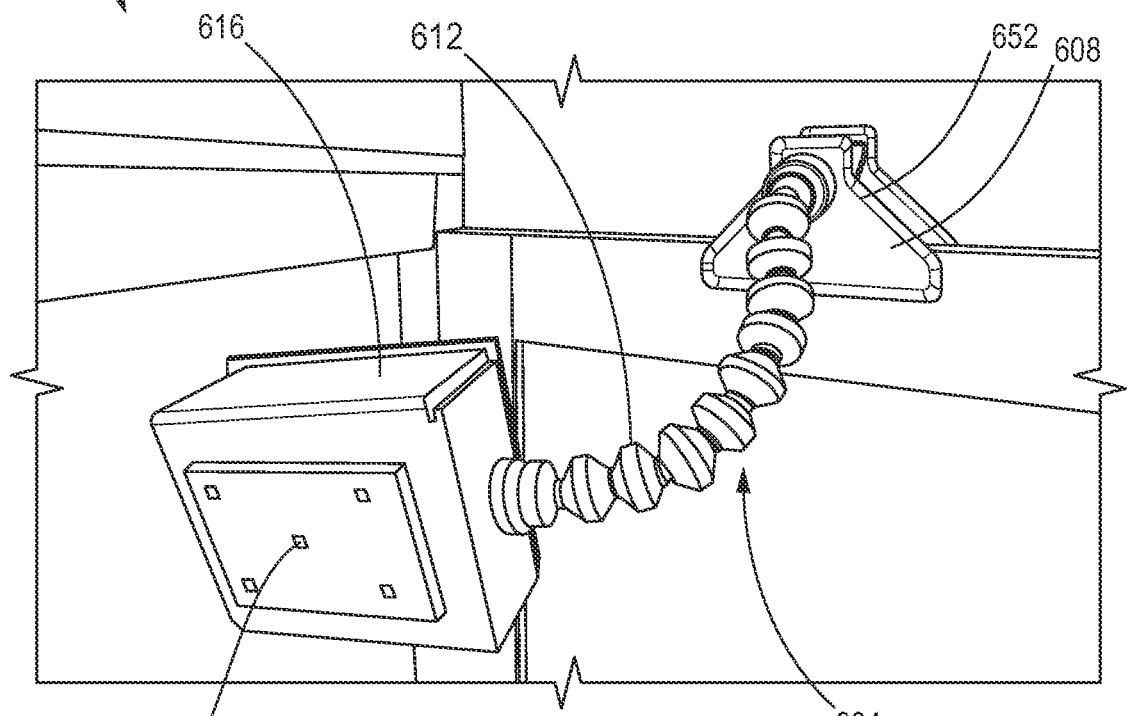
FIG. 8 is a perspective view of another portable lamp.

FIG. 8 illustrates a sixth portable lighting system 600. The lighting system 600 is similar to the lighting system 500 of FIGS. 6-7, and similar features are denoted with the same reference numbers plus 100. The lighting system 600 may include a portable lamp 604 having a mounting base 608, a neck 612, and a light head 616. In the illustrated embodiment, the mounting base 608 is formed as a spring clip 652. The light head 616 is rectangularly shaped with a light source 624 formed as an LED panel. The lighting system 600 provides a simplified, but still highly adjustable solution for illumination in a workspace.

Figure 10:
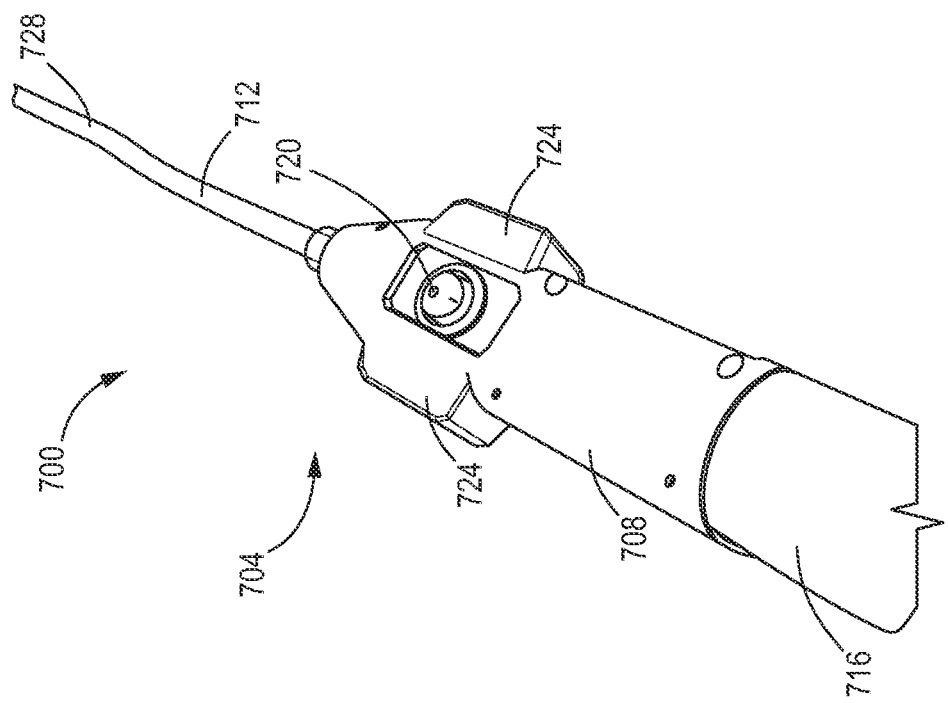
FIG. 10 is a perspective view of a portion of the portable rope light of FIG. 9.
Figure 9:
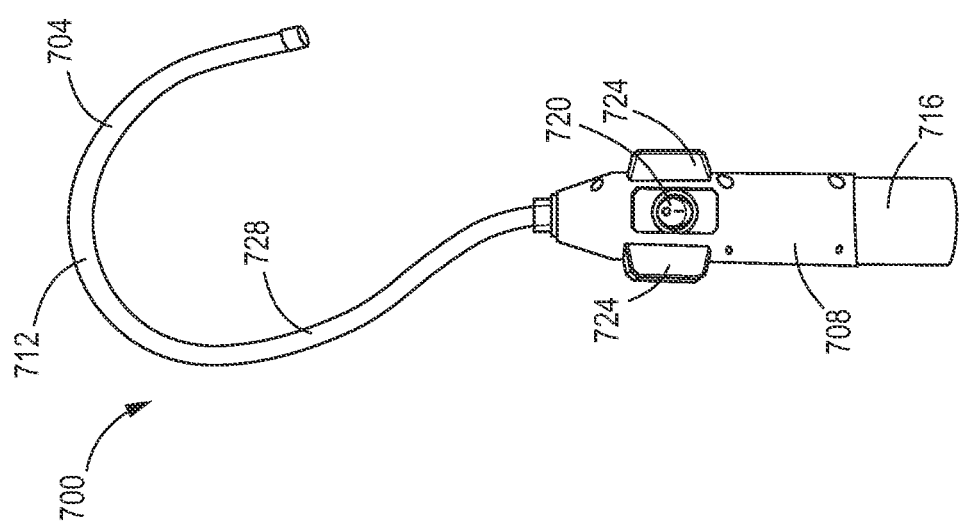
FIG. 9 is a perspective view of a portable rope light.

FIGS. 9-10 illustrate a seventh portable lighting system 700. The lighting system 700 may include a portable rope light 704. The portable rope light 704 may include a base 708 and a light strand 712 extending from the base 708. The illustrated base 708 is an elongated member having a first end and a second end. The base 708 provides a grip for a user to hold and operate the portable rope light 704. The base 708 may receive a removable rechargeable battery 716 and may include a switch 720. The battery 716 may be located at an end of the base 708 opposite from the light strand 712. The battery 716 may also provide part of the grip. The switch 720 is located on a side of the base 708 between the first end and the second end. The switch 720 may be positioned to be operated by a user while holding the base 708. The base 708 may further include a pair of magnetic surfaces 724 configured to mount the rope light 704 to a workspace.

The light strand 712 is coupled to and extends from an end of the base 708 opposite from the battery 716. The light strand 712 is generally cylindrical and has an outer diameter that is smaller than a corresponding outer dimension of the base 708. The light strand 712 also has a length that is greater than a length of the base 708. The light strand 712 is pliable and may be shaped as needed. The light strand 712 may be sufficiently rigid to maintain whatever shape it is bent to without requiring a constant external force. The light strand 712 may include a light source 728 that is adapted to emit light along a length of the light strand and at an end thereof. The light source 728 may include a plurality of LEDs mounted along the light strand 712. The light source 728 may be mounted to direct light toward one side of the light strand 712, or in some embodiments, the light source 728 may be mounted to provide illumination all around the light strand 712. The switch 720 may be electrically connected to the battery 716 and the light source 728 to selectively power the light source 728.

The lighting system 700 provides adjustable illumination for tight spaces. The portable rope light 704 is lightweight and easily transported to a workspace. The light strand 712 may be shaped to provide a specific illumination output. The rope light 704 may be positioned and mounted using the magnetic surfaces 724. The light strand 712 may be shaped before or after the rope light 704 has been mounted. The switch 720 may be operated to provide illumination to the workspace. The lighting system 700 provides a portable and adjustable illumination solution for tight spaces.

Figure 11:
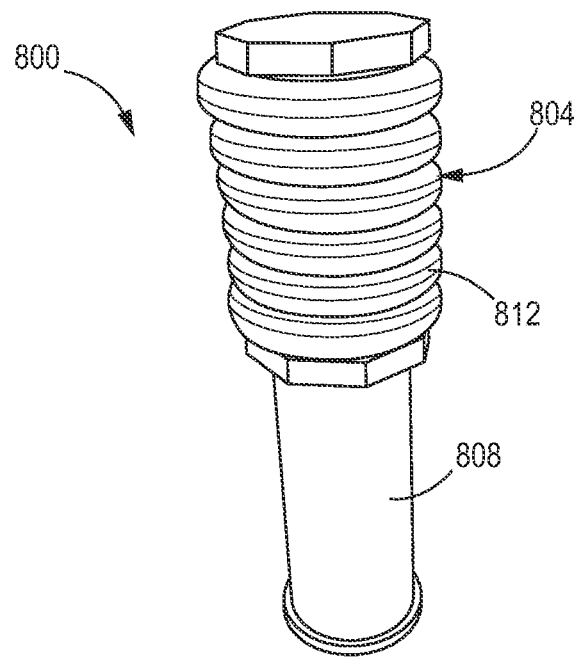
FIG. 11 is a perspective view of another portable rope light while in a storage configuration.
Figure 12:
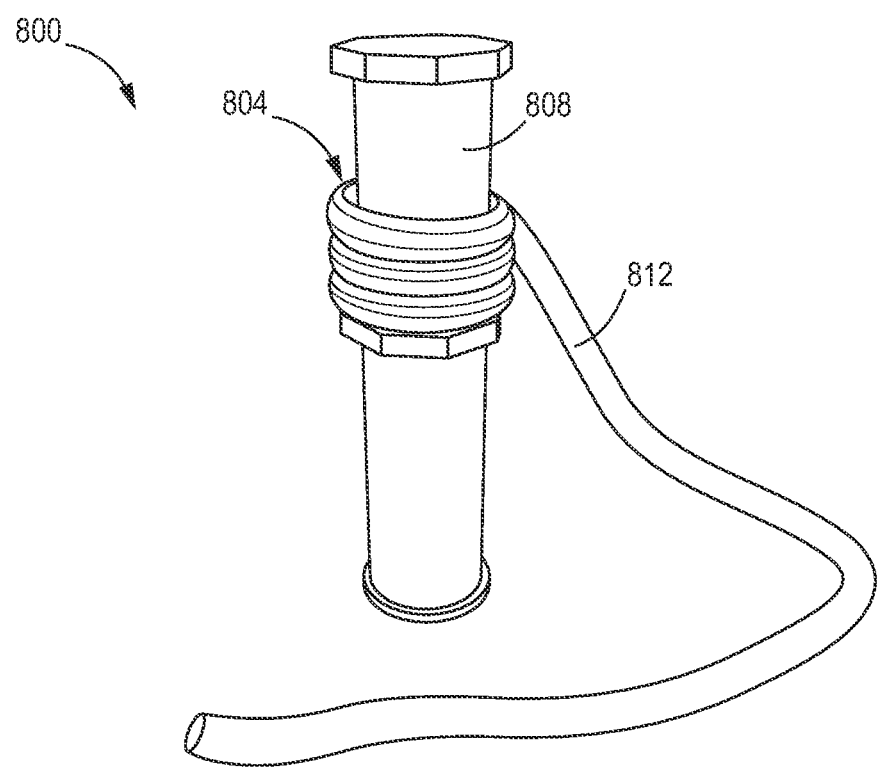
FIG. 12 is a perspective view of the portable rope light of FIG. 11 while in a use configuration.

FIGS. 11-12 illustrate an eighth portable lighting system 800. The lighting system 800 is similar to the lighting system 800 of in FIGS. 9-10. The lighting system 800 may include a portable rope light 804 with a base 808 and a light strand 812. The light strand 812 may be positioned in a storage configuration, as shown in FIG. 11, with the light strand 812 wrapped around the base 808. The light strand 812 may also be positioned in a series of usage configurations with the light strand 812 extending from (e.g., unwrapped from) the base 808. One such usage configuration is shown in FIG. 12. The light strand 812 may be unwound from around the base 808 until a desired length is exposed. The exposed length of the light strand 812 may then be used to provide illumination in tight areas. The light strand 812 may be pliable so that the illumination can be adjusted according to the application. In some embodiments, the light strand 812 may be at least one foot long. In other embodiments, the light strand 812 may be between three and ten feet long. In further embodiments, the light strand 812 maybe longer or shorter.

The base 808 is generally cylindrical and defines a mounting surface around which the light strand 812 may be wrapped. The illustrated mounting surface is equal to about half of an overall height or length of the base 808. The base 808 also includes a grip surface that a user can grab and hold to facilitate wrapping and unwrapping the light strand 812 from the base 808. The grip surface is separated from the mounting surface by a flange. The base 808 may support the battery for powering the light strand 812. The base 808 may include a variety of mounting features to allow the lighting system 800 to be mounted in a workspace. The lighting system 800 provides a compact and adjustable illumination solution for tight spaces.

Figure 13:
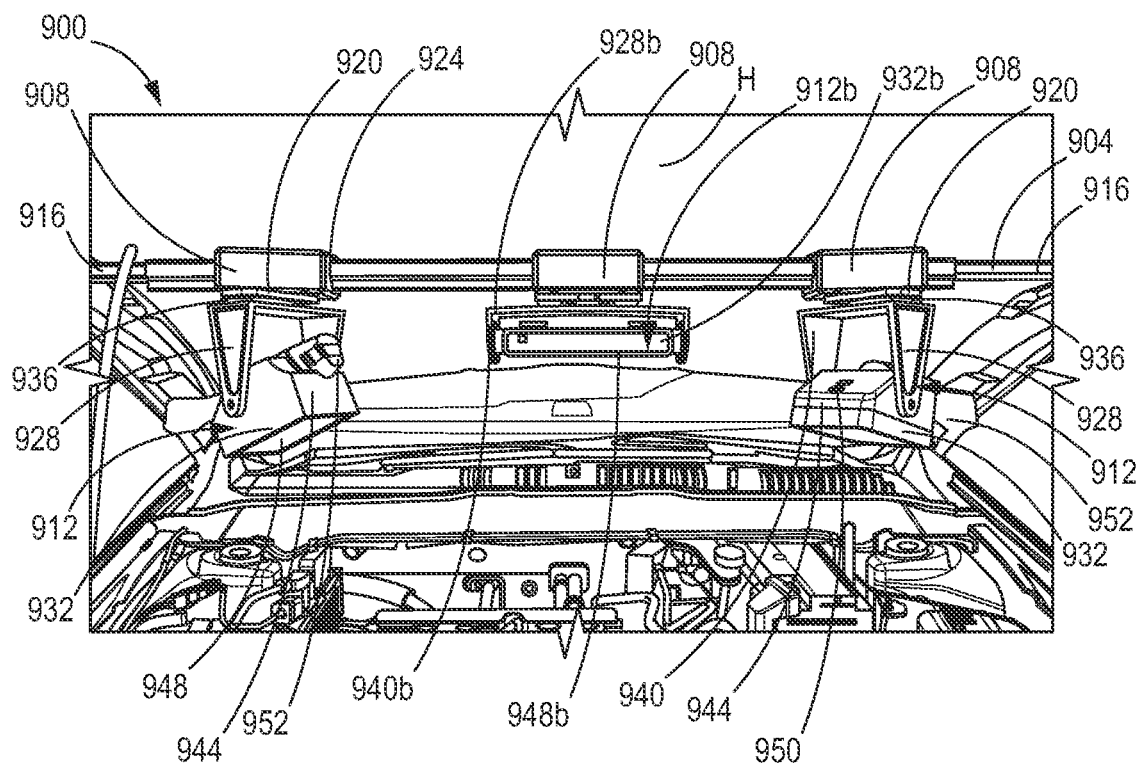
FIG. 13 illustrates a portable under hood lighting system connected to a hood of a vehicle.

FIG. 13 depicts a ninth portable lighting system 900. The lighting system 900 is an under-hood lighting system. The lighting system 900 may include a support bar 904, a plurality of adaptors 908, and a plurality of light bodies 912. The support bar 904 may be extendable and may include hooks 916 on the ends to connect to an underside of a hood H of a vehicle. The adaptors 908 are slidably mounted on the support bar 904. Each adaptor 908 includes a magnetic surface 920 and a central channel 924 which may be positioned around the support bar 904. The light bodies 912 include a bracket 928 and a light head 932 pivotally supported on the bracket 928. The bracket 928 may include a magnetic surface 936 and a pair of legs 940. The light head 932 is supported between the pair of legs 940. The light head 932 may include a housing 944 containing a light source 948 and a rechargeable battery 952 removably coupled to the housing 944. The housing 944 also may include a switch 950 in electrical connection with the battery 952 and the light source 948 for selectively powering the light source 948.

To assemble the lighting system 900, the adaptors 908 may be slid onto the support bar 904. The support bar 904 may then be extended and coupled to the hood H using the hooks 916. To connect the light bodies 912 to the adaptors 908, the magnetic surfaces 936 of the brackets 928 may be positioned adjacent the magnetic surfaces 920 of the adaptors 908. The magnetic connection allows each light body 912 to rotate a full 360 degrees with respect to the adaptor 908 and support bar 904 to direct the light. The light bodies 912 may be pivoted about the associated brackets 928 to further direct the light. The light bodies 912 may be removed by pulling the bracket 928 away from the adaptor 908. The light bodies 912 may then be carried by a user and used to illuminate other areas. In some embodiments, the magnetic surface 936 may be used to mount the light bodies 912 to a magnetic surface in the workspace remote from the light system 900.

In some embodiments, the adaptors 908 may magnetically support more than one type of light body 912 or may support additional accessories. The additional accessories may include, among other things, ferromagnetic tools or parts or tools or parts mounted in a ferromagnetic holder. A second light body 912b may include a bracket 928b with a magnetic surface 936b and a pair of legs 940b supporting a light head 932b therebetween. The light head 932b may include a light source 948b and a rechargeable battery. The light head 932b may be removably coupled to the bracket 928b, such that the light head 932b may be used as a portable task light or flash light. The light head 932b may further include a charging port for charging the battery. The system 900 provides a modular illumination solution for lighting under hood spaces.

Figure 14:
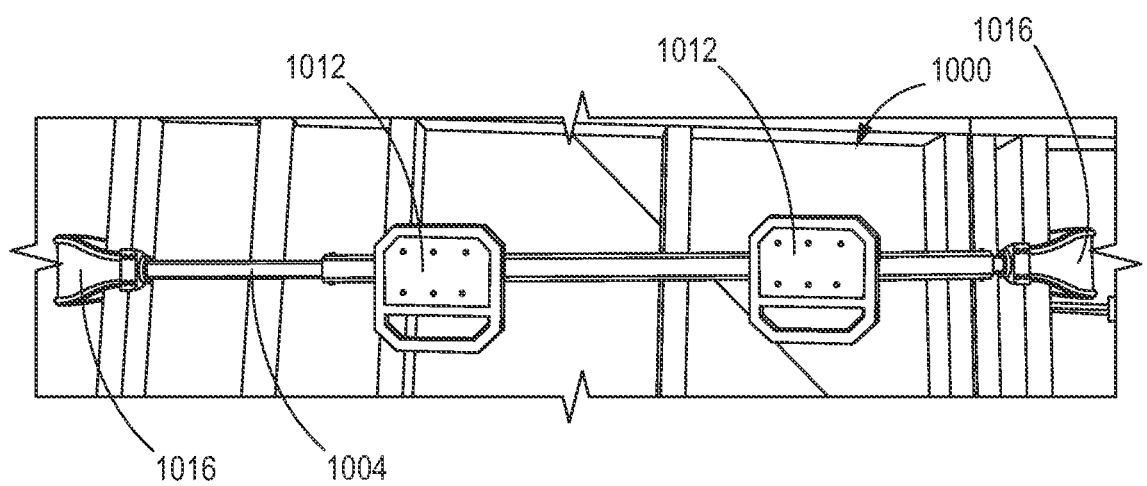
FIG. 14 is a front view of another portable under hood lighting system.
Figure 15:
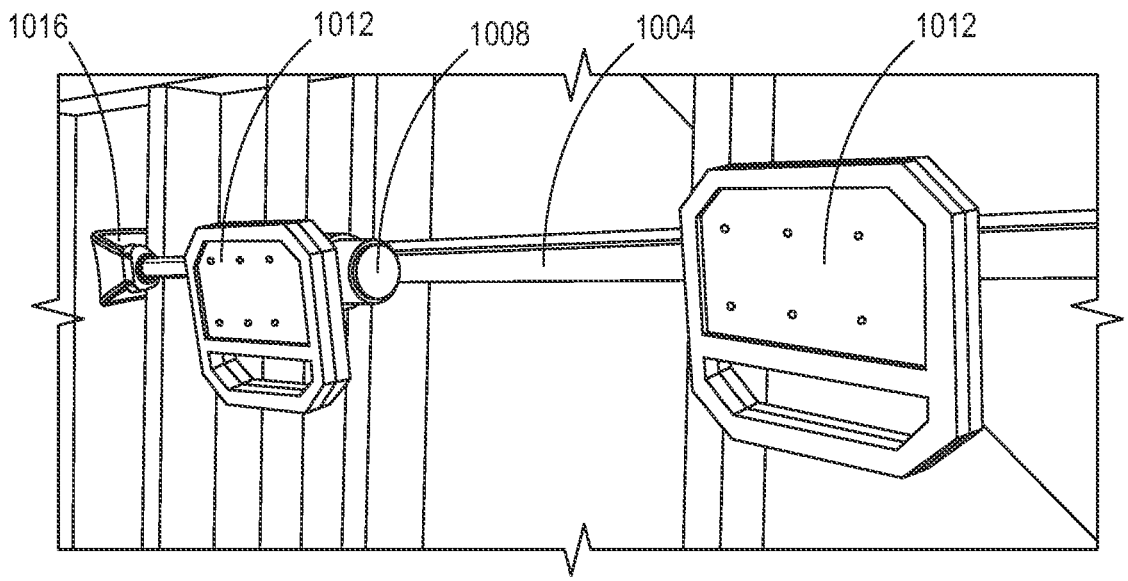
FIG. 15 is a perspective view of the portable under hood lighting system of FIG. 14.
Figure 16:
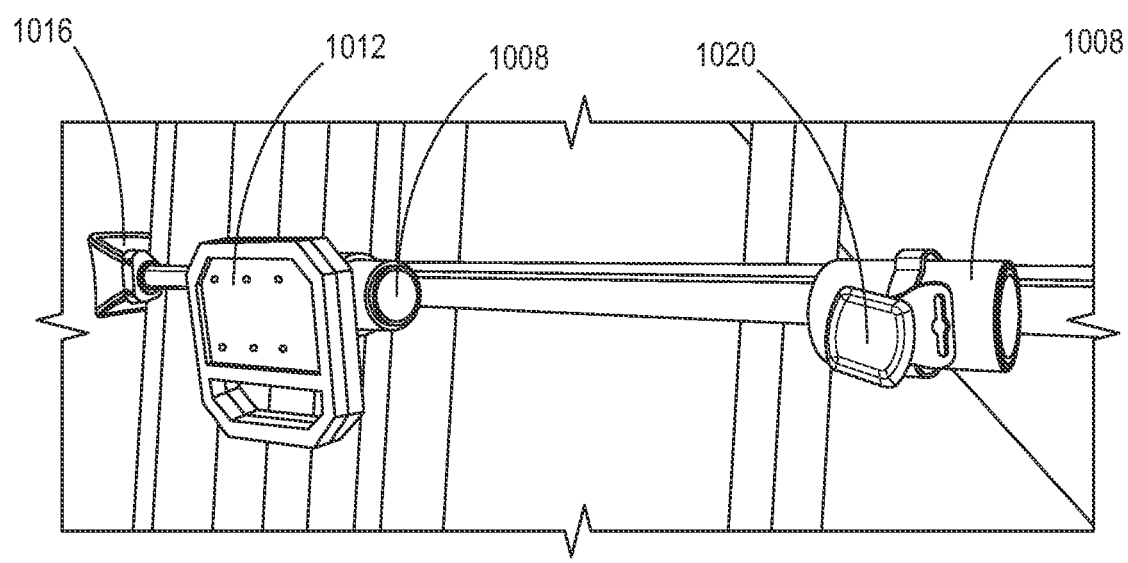
FIG. 16 is another perspective view of the portable under hood lighting system of FIG. 14 shown with a light body removed.

FIGS. 14-16 illustrate a tenth portable lighting system 1000. The lighting system 1000 is similar to the lighting system 900 of FIG. 13. The lighting system 1000 includes a support bar 1004 with hooks 1016, a plurality of adaptors 1008, and a plurality of light bodies 1012. FIG. 16 illustrates the lighting system 1000 with one of the plurality of light bodies 1012 removed, exposing a magnetic surface 1020 of the adaptor 1008.

Figure 17:
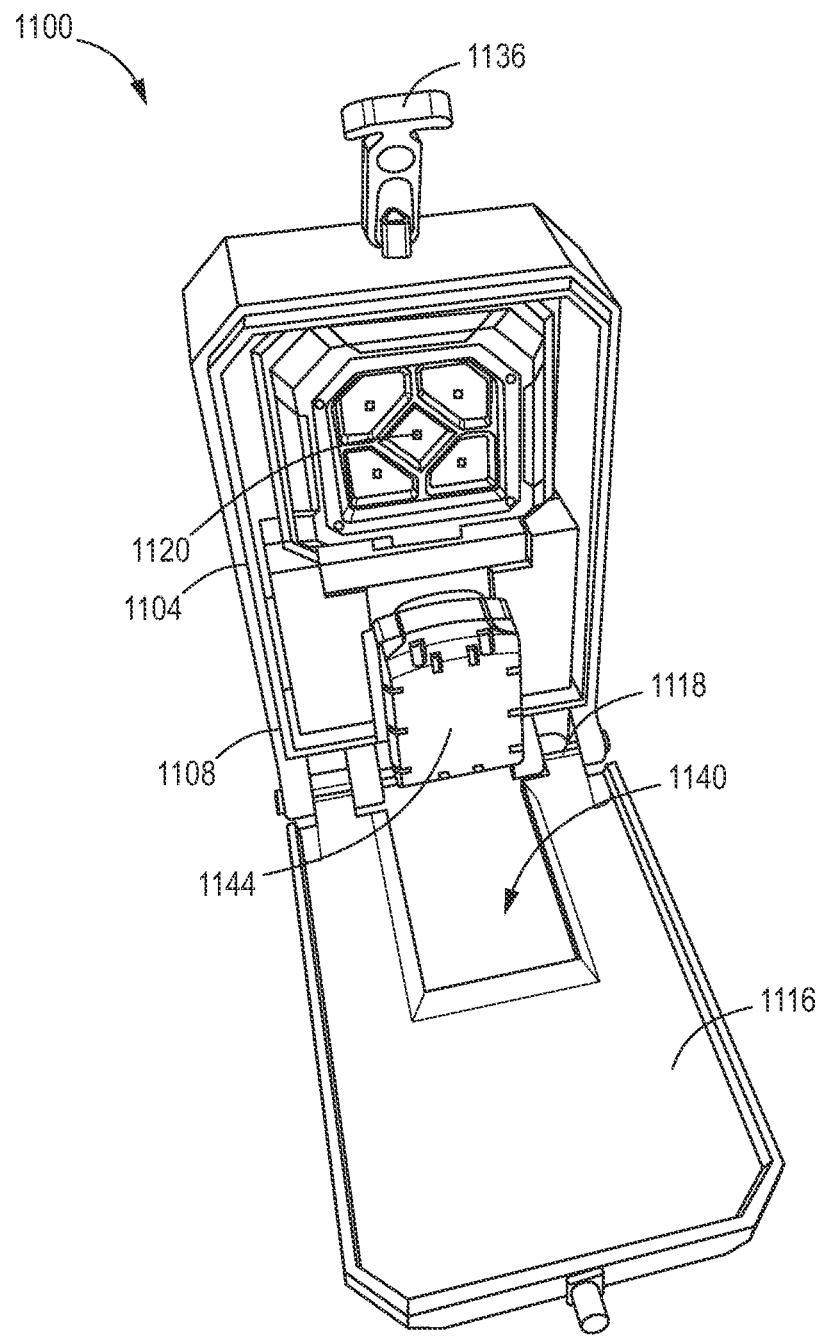
FIG. 17 is a perspective view of a portable box light with a cover in an open position.
Figure 18:
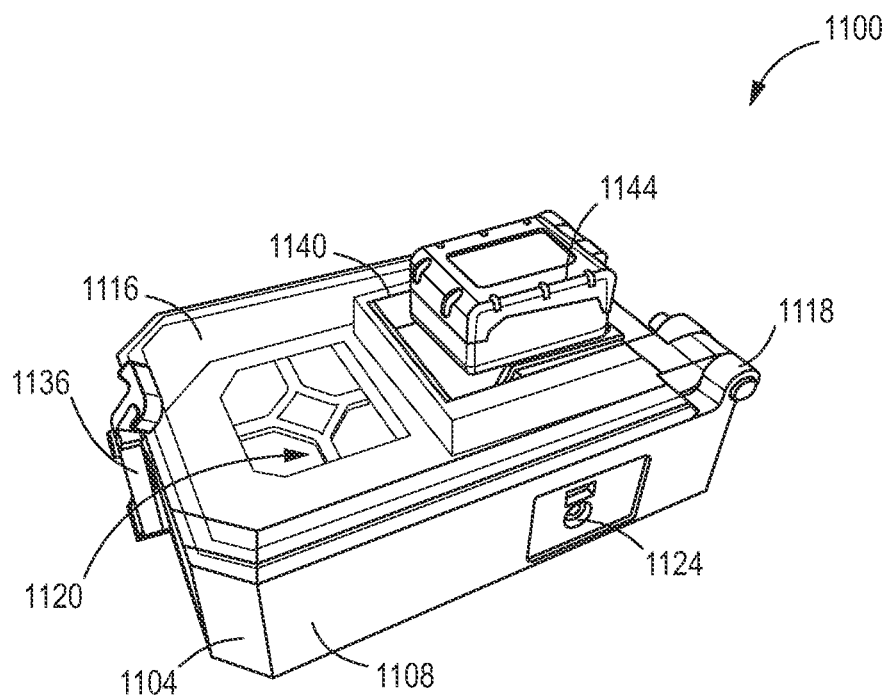
FIG. 18 is a perspective view of the portable box light of FIG. 17 with the cover in a closed position.
Figure 19:
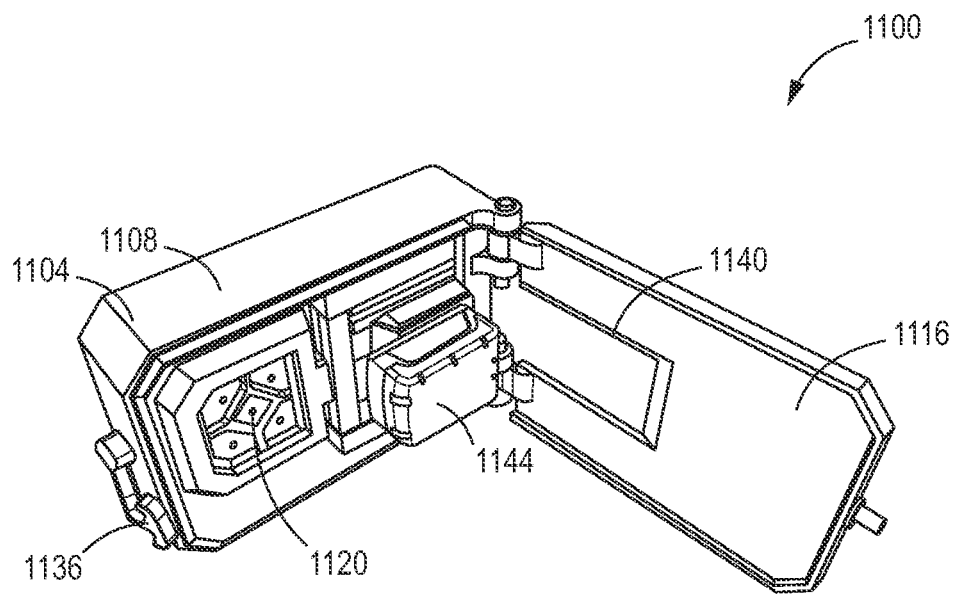
FIG. 19 is another perspective view of the light of FIG. 17 with the cover in the open position.

FIGS. 17-19 illustrate an eleventh portable lighting system 1100. The lighting system 1100 may include a light body 1104 having a main housing 1108 and a cover 1116. The cover 1116 is rotatably coupled to a front of the light body 1104 via a hinge 1118 and is movable between a closed position (FIG. 18) and an open position (FIGS. 17 and 19). The cover 1116 may be formed of translucent plastic and may act as a diffuser. The main housing 1108 contains a light source 1120 positioned adjacent the cover 1116 when the cover 1116 is in the closed position. A switch 1124 is disposed on the main housing 1108 and is adapted to selectively power the light source 1120.

In the closed position, the cover 1116 forms a front surface of the main housing 1108 and a latch 1136 engages the cover 1116 (FIG. 18). In the closed position, the cover 1116 is disposed adjacent the light source 1120. The light emitted from the light source 1120 is diffused by the cover 1116 such that the light body 1104 provides an area lighting effect to a workspace. In the open position, the cover 1116 extends away from the main housing 1108 and the latch 1136 is disengaged (FIGS. 17 and 19). In the open position, the cover 1116 is not disposed over the light source 1120 and light emitted from the light source 1120 travels directly into the workspace. The light body 1104 therefore provides a flood lighting effect to the workspace. As shown in FIG. 19, in the open position the cover 1116 may be used to stabilize the light body 1104. The cover 1116 may include a cutout 1140. A rechargeable battery 1144 is removably coupled to the light body 1104 through the cutout 1140.

The lighting system 1100 provides a portable and compact illumination solution for situations requiring both area lighting and flood lighting alternately. The lighting system 1100 may be positioned in any orientation or coupled to a supporting structure. The cover 1116 may be moved between the open position and the closed position to alter the illumination effect as needed.

Figure 20:
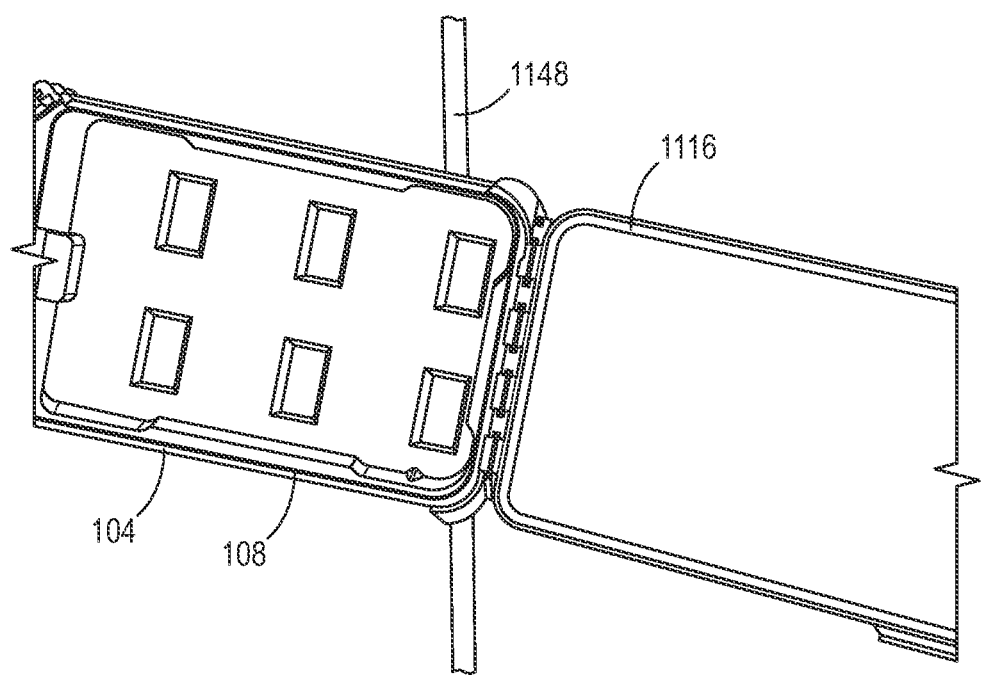
FIG. 20 is a perspective view of another portable box light mounted to a pole with a cover in an open position.

As shown in FIG. 20, in some embodiments, the light body 1104 may be able to mount to a support pole 1148. The light body 1104 may then be converted between flood lighting and area lighting by moving the cover between an open position and a closed position.

Figure 21:
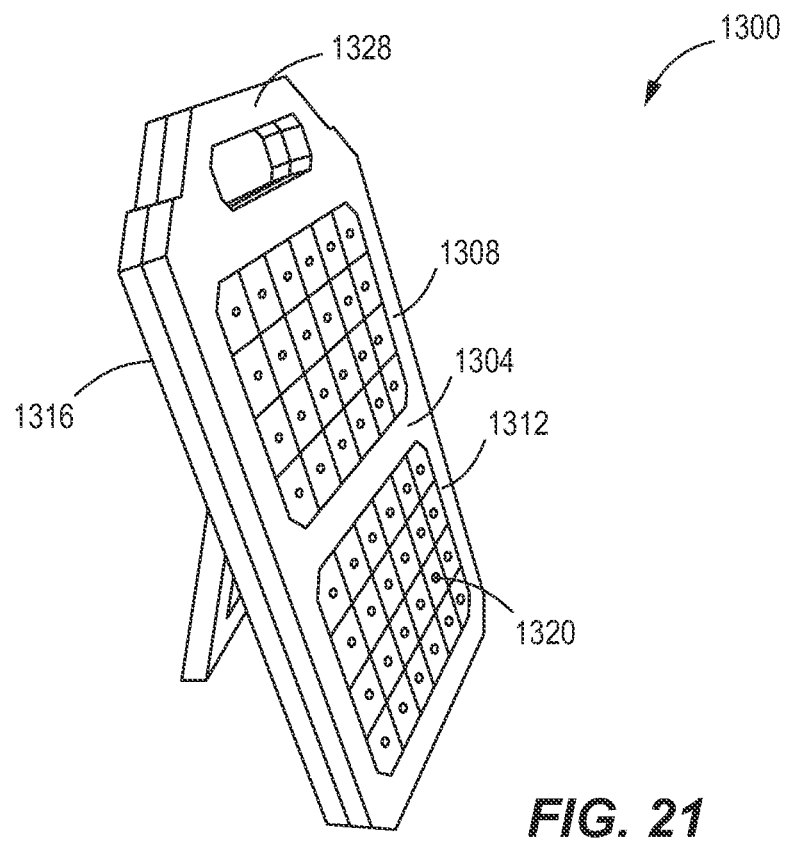
FIG. 21 is a perspective view of a portable panel light.

FIG. 21 illustrates a twelfth portable lighting system 1300. The lighting system 1300 may include a light body 1304 with a housing 1308 having a front surface 1312 and a rear surface 1316 separated by a width. The width may be small, such that the light body 1304 may be substantially flat. In other words, the light body 1304 may be a panel. A front light source 1320 may be disposed adjacent the front surface 1312 and a rear light source may be disposed adjacent a rear surface 1316. A handle 1328 is formed at a top of the housing 1308. The lighting system 1300 may include a rechargeable battery and a switch to selectively power the light sources 1320, 1324. The system 1300 provides a compact and slim lighting solution for area illumination.

Figure 22:
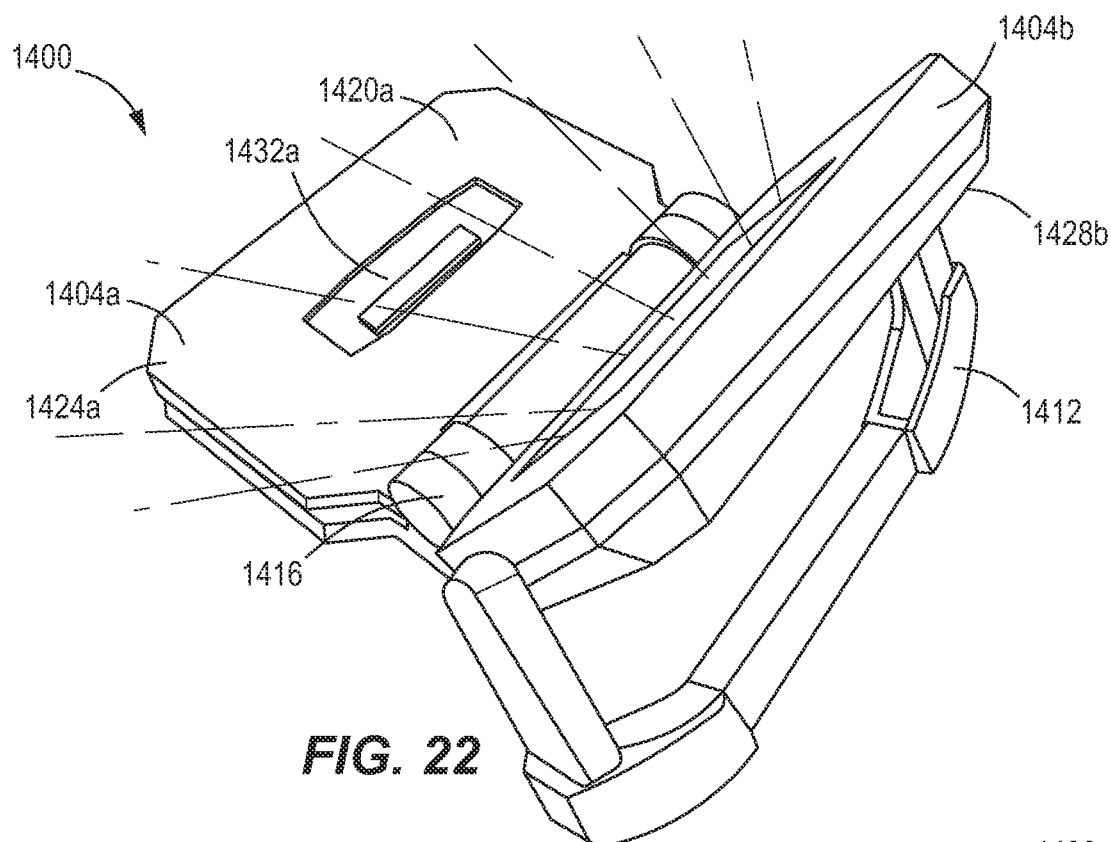
FIG. 22 is a perspective view of another portable panel light.
Figure 23:
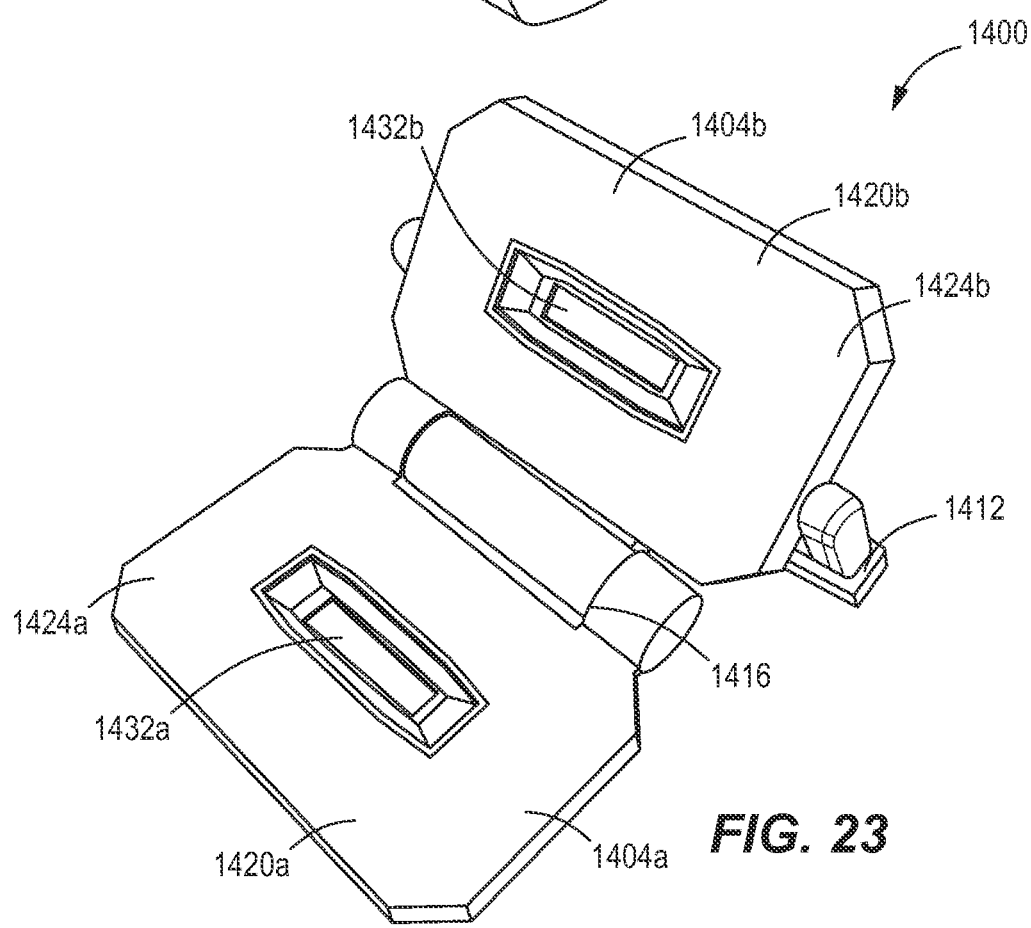
FIG. 23 is another perspective view of the portable panel light of FIG. 22.

FIGS. 22-23 illustrate a thirteenth portable lighting system 1400. The lighting system 1400 may include a plurality of light panels 1404 rotatably mounted on a hinge 1416. In the illustrated embodiment the plurality of light panels 1404 may include a first light panel 1404a and a second light panel 1404b. The light panels 1404a and 1404b may be identical, such that each of the light panels 1404a, 1404b may include a housing 1420 having a front surface 1424 and a rear surface 1428. The housing 1420 may contain a light source 1432 disposed adjacent the front surface 1424 and a rechargeable battery. A charging port and a switch may be disposed on the rear surface 1428 of each light panel 1404a,

1404b. In the illustrated embodiment, the light source 1432 is shown as generally centered on the front surface 1424, however, in other embodiment the light source 1432 may include multiple light sources 1432 spread across the front surface 1424 to create a flood light output. Other arrangements and amounts of light sources 1432 can be used instead. In some embodiments the light panels 1404a, 1404b are different from each other so that the lighting system 1400 can provide alternate lighting solutions in a single system.

The light panels 1404a, 1404b are disposed on and rotatable about the hinge 1416. A handle 1412 may be pivotally mounted on one of the light panels 1404. In the illustrated embodiment, the handle 1412 is mounted to the light panel 1404b and is formed in a U-shape. The handle 1412 is pivotable about an axis that extends parallel to the hinge 1416 but is spaced therefrom. The handle 1412 may pivot between a first position (not shown) in which the handle 1412 is generally surrounds the outside of the light panel 1404b, and a second position in which the handle 1412 acts as a stand for the lighting system 1400. The handle may inhabit additional positions between and beyond the first and second positions.

The light panels 1404 may inhabit a plurality of positions, ranging from to a maximum rotation position where the first light panel 1404a may be rotated 270 degrees apart from the second light panel 1404b about the hinge 1416, and a closed position where the front surface 1424a of the first light panel 1404a may be directly adjacent the front surface 1424b of the second light panel 1404b. One of the plurality of positions may include a flat position in which the first light panel 1404a may be rotated 180 degrees apart from the second light panel 1404b such that the front surfaces 1424 are pointing in the same direction. The light panels 1404 may be activated by operation of the switch. In the illustrated embodiment, the first light panel 1404a may be activated and charged separately from the second light panel 1404b. In some embodiments, the light panels 1404 may be in electrical communication such that they may be activated and charged using a single switch and charging port. The lighting system 1400 provides a compact and easily transportable solution lighting solution.

Figure 24:
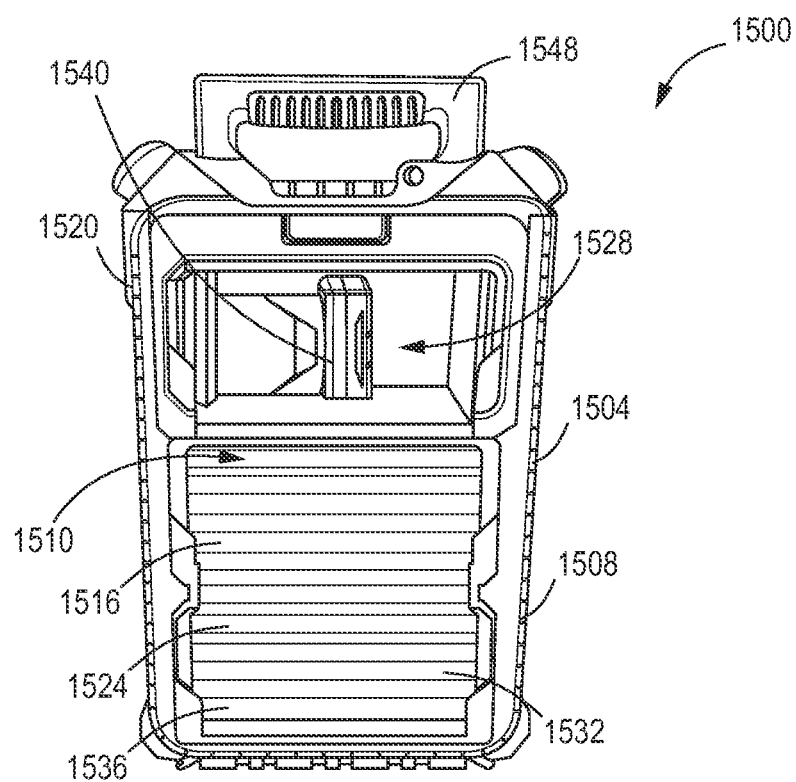
FIG. 24 is a front view of a portable box light.
Figure 25:
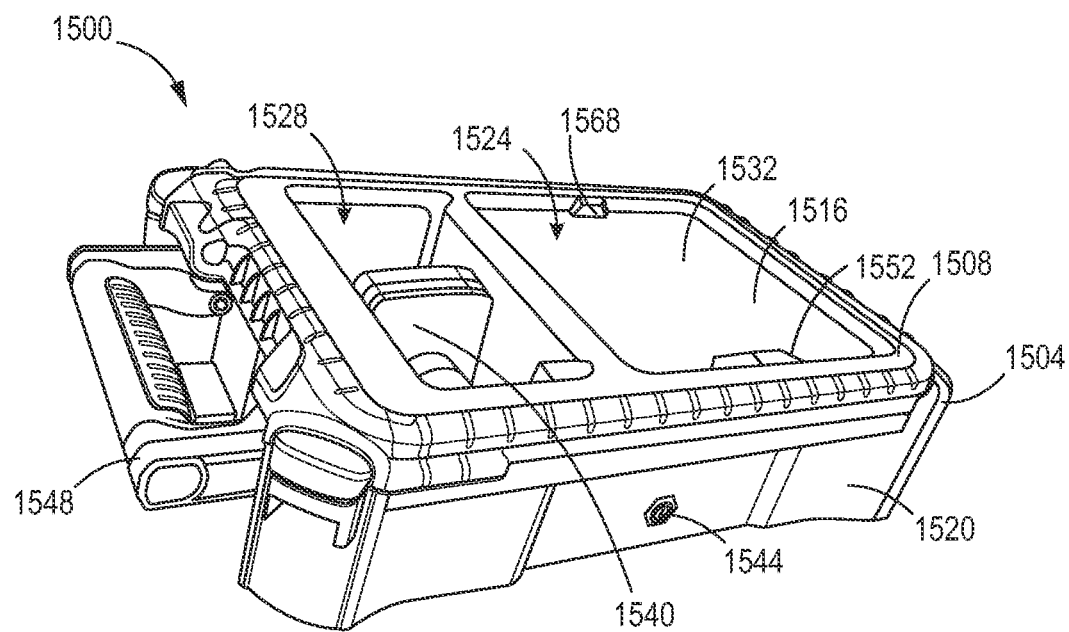
FIG. 25 is a front perspective view of the portable box light of FIG. 24.

FIG. 24-29 illustrate a fourteenth portable lighting system 1500. The lighting system 1500 may include a case 1504 having a housing 1508 including a rear or lower surface 1512 (FIG. 26) and a front surface 1516 connected by one or more sidewalls 1520 extending from the lower surface 1512. The housing 1508 may define an inner cavity 1510 including a first space 1524 and a second space 1528. The first space 1524 may include a light source 1532 disposed adjacent a translucent portion 1536 of the front surface 1516. A removable rechargeable battery 1540 is removably mounted in the second space 1528. A switch 1544 may be positioned on one of the sidewalls 1520 of the housing 1508. The switch 1544 may be electrically connected to the battery 1540 and the light source 1532 to selectively provide power from the battery 1540 to the light source 1532. The second space 1528 may be positioned adjacent the first space 1524 and may be recessed from the front surface 1516 so that the second space 1528 is accessible from the front of the case 1504. The battery 1540 may be installed in the second space 1528 through the front surface 1516 and may be removably connected to a battery mount (not shown). In some embodiments, the lighting system 1500 may include a cover for closing off the second space 1528. A handle 1548 may be pivotally connected to one of the sidewalls 1520 of the housing 1508 and may be movable between an extended position, as shown in FIGS. 24-25, and a stowed position, as shown in FIGS. 26-29. In some embodiments, the handle 1548 may be used to support the lighting system 1500 for example, by hanging the lighting system 1500 above a surface by the handle 1548. The lighting system 1500 may be therefore compact and easily transportable.

Figure 26:
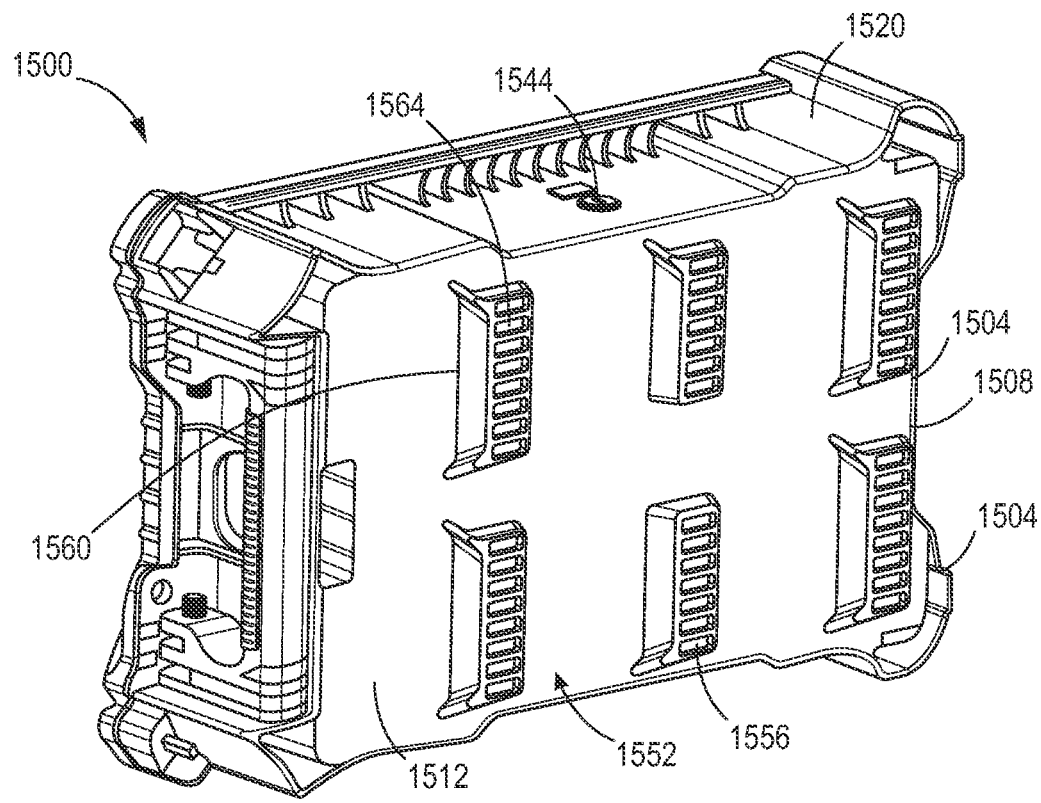
FIG. 26 is a rear perspective view of the portable box light of FIG. 24.
Figure 27:
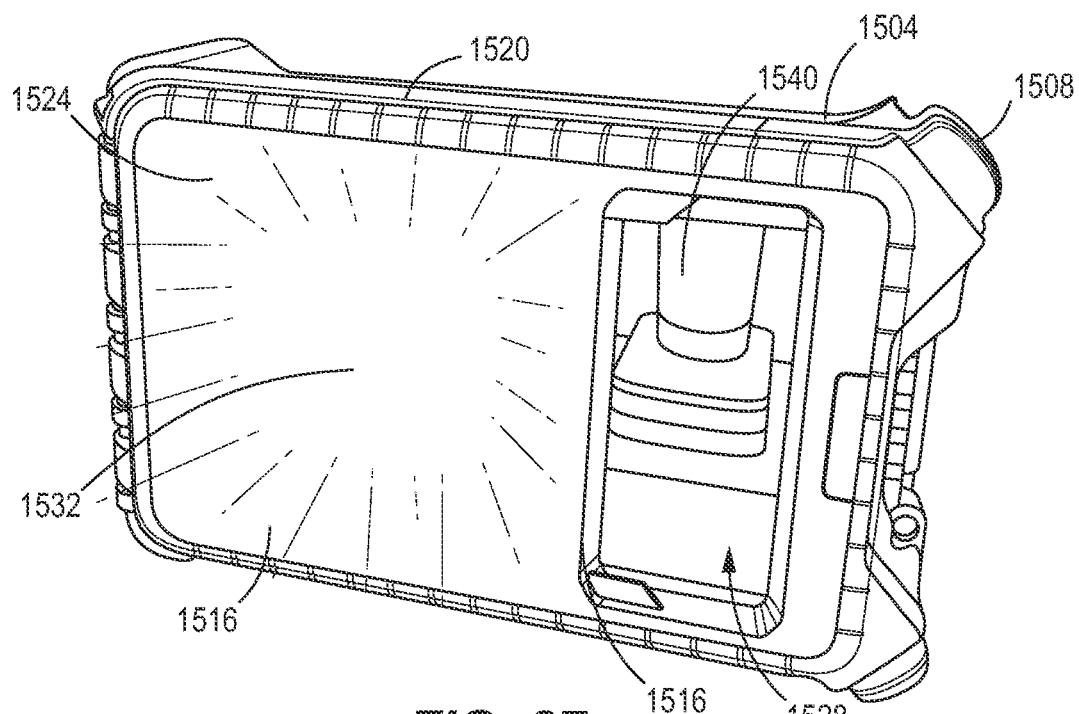
FIG. 27 is a perspective view of the portable box light of FIG. 24 with a light source activated.
Figure 28:
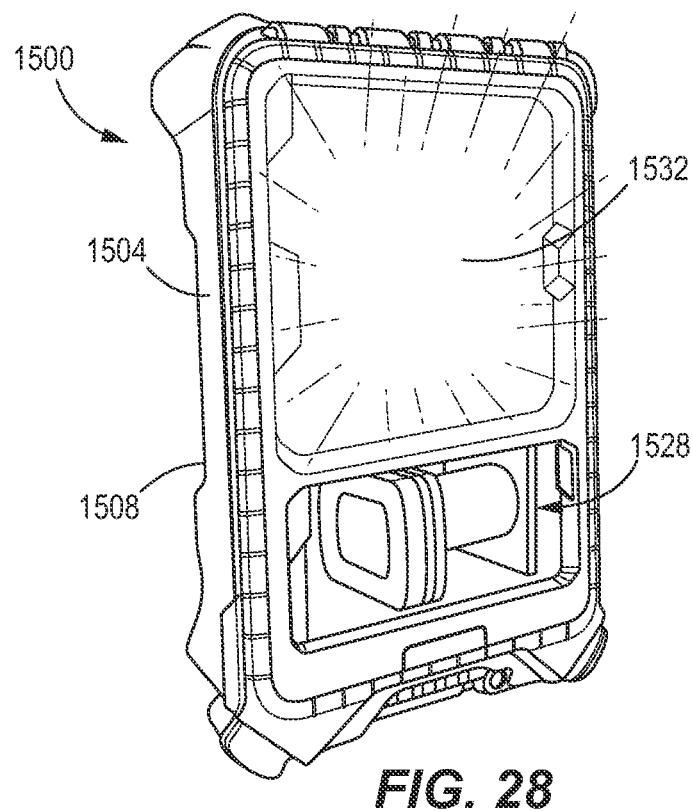
FIG. 28 is another perspective view of the portable box light of FIG. 24 with the light source activated.
Figure 29:
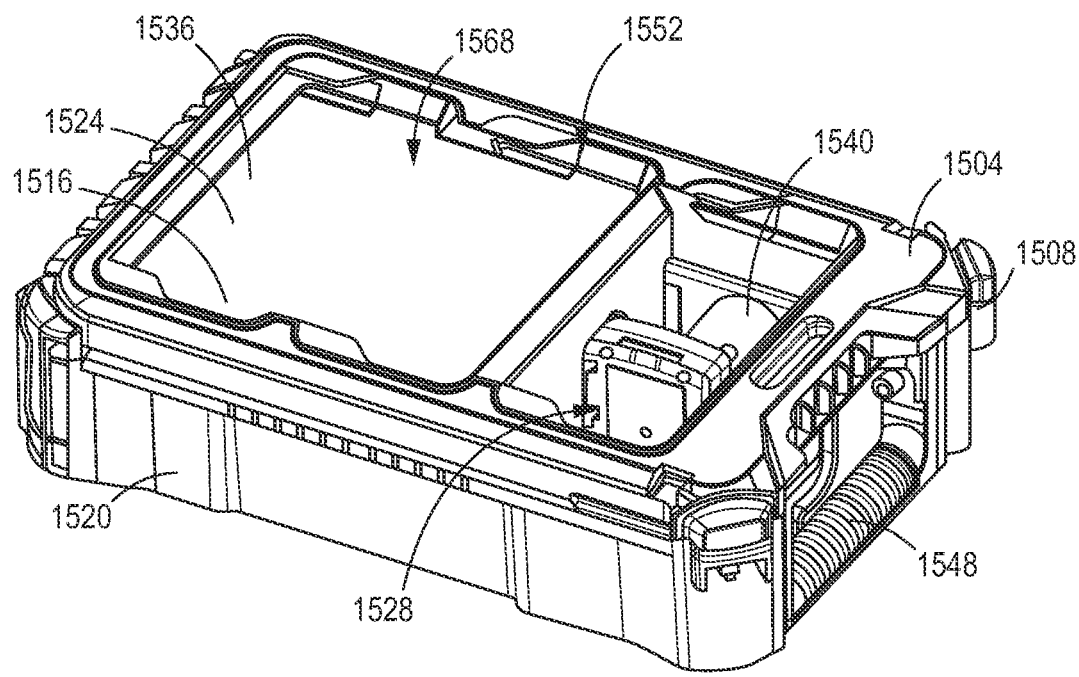
FIG. 29 is another front perspective view of the portable box light of FIG. 24.

The lighting system 1500 may be part of a stackable modular storage system. The modular storage system may include a plurality of cases configured to mount to each other. For example, the cases may be compatible with the other cases included in Milwaukee Electric Tool Company's PACKOUT™ platform. The cases may contain integrated devices, such as the lighting system 1500, or the cases may provide storage space for removable contents. Each case may include a set of matching mounting features 1552. The housing 1508 may include a set of projections 1556 extending from the rear surface 1512, as shown in FIG. 26. The projections 1556 may be shaped as a truncated pyramid and may include a base 1560 which tapers to a truncated end 1564. The base 1560 may be wider than the truncated end 1564. The projections 1556 may interface with a set of cleats or depressions 1568 such as those positioned on the front surface 1516 of the housing 1508. The lighting system 1500 may be therefore easily transportable as part of the stackable modular storage system.

Figure 30:
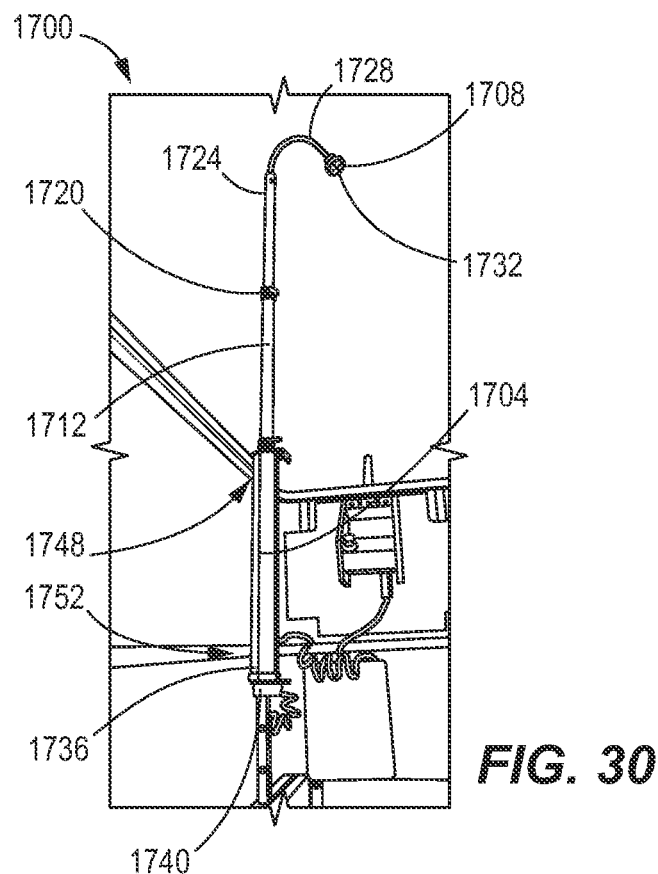
FIG. 30 is a perspective view of a portable pole light in an extended position.
Figure 31:
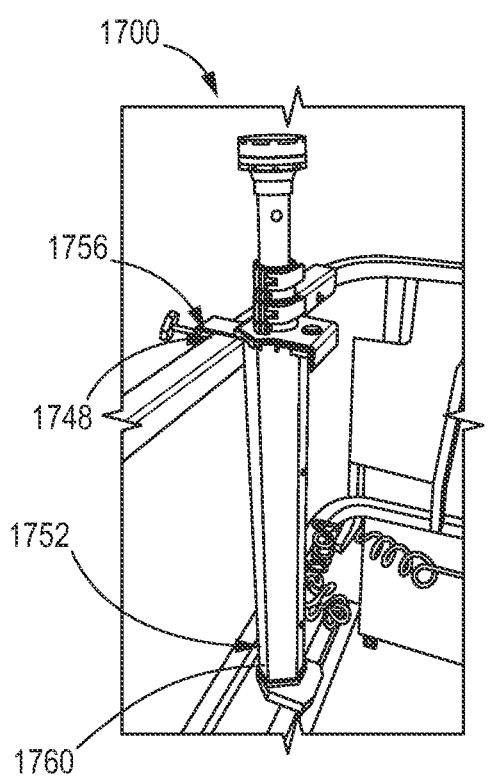
FIG. 31 is a perspective view of the portable pole light of FIG. 30 in a retracted position.
Figure 32:
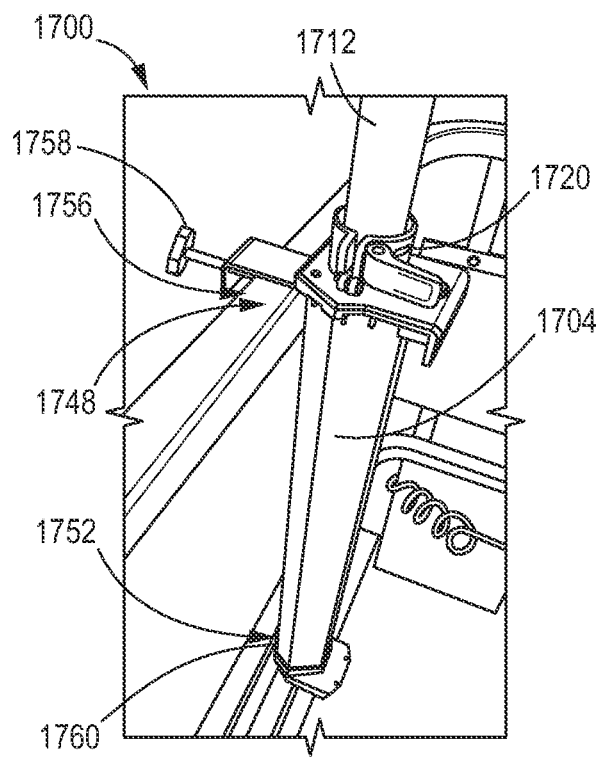
FIG. 32 is a perspective view of a portion of the portable pole light of FIG. 30.

FIGS. 30-32 illustrate a fifteenth portable lighting system 1700. The lighting system 1700 may include a collapsible pole 1704 and a light head 1708. The collapsible pole 1704 may include a set of telescoping rods 1712 able to slide relative to each other to alter a length of the collapsible pole 1704. The telescoping rods 1712 are equipped with lever locks 1720 to secure the collapsible pole 1704 at any length. The light head 1708 may be coupled to an upper end 1724 of the collapsible pole 1704 by a pliable neck 1728. The neck 1728 may be formable to adjust the light head 1708 to create the desired illumination. The light head 1708 may include a light source 1732. A lower end 1736 of the collapsible pole 1704 may be configured to receive a removable rechargeable battery 1740. Power may then be supplied through the telescoping rods 1712 and neck 1728 to the light head 1708. A switch 1744, adapted to selectively power the light source 1732, may be disposed on the light head 1708 or may be disposed on the collapsible pole 1704. The lighting system 1700 may be movable between an extended state, illustrated in FIG. 30, and a collapsed state, illustrated in FIG. 31. The collapsed state allows the lighting system 1700 to be transported and stored easily and decreases the risk of damaging the lighting system in transport. The extended state allows the light source 1732 to easily illuminate an area from overhead.

The collapsible pole 1704 may be mounted to a vertical support or horizontal support such as supports in a lift, studs in a wall, scaffolding, or other supports frequently found in worksites. The collapsible pole 1704 may include a first mounting feature 1748 and a second mounting feature 1752. The first mounting feature 1748 may be located at a top of a largest of the telescoping rods 1712 and may be formed as a clamp 1756. The clamp 1756 may be able to couple to horizontal or vertical supports. In some embodiments, the clamp 1756 may be manually tightened through a knob 1758 to secure the rods 1712 to the support. In some embodiments, the clamp 1756 may be biased toward a clamping position and the knob 1758 can be used to extend the clamp 1756 against the biasing force to couple or uncouple the clamp 1756 from the support. The second mounting feature 1752 may include a magnetic surface 1760 located adjacent a bottom of the largest of the telescoping rods 1712. The magnetic surface 1760 may magnetically connect to a support surface. In the illustrated embodiment, the first mounting feature 1748 may support a weight of the lighting system 1700 and the second mounting feature 1752 may serve to stabilize the lighting system 1700.

As shown in FIGS. 33-35, in one embodiment, the neck 1728 is omitted and the light head 1708 is formed as a light stick 1764. The light stick 1764 may include a light source 1768, such as an LED strip, and may be pivotally and rotatably mounted on the top of the collapsible pole 1704. When in use, the collapsible pole 1704 may be extended to the desired height and fastened by the lever locks 1720. The light stick 1764 may then be rotated and pivoted as needed to provide the desired illumination. When not in use, the light stick 1764 may retract into the collapsible pole, as shown in FIG. 34. A length of the lighting system 1700 in a collapsed state may be no more than about 30 inches.

Figure 36:
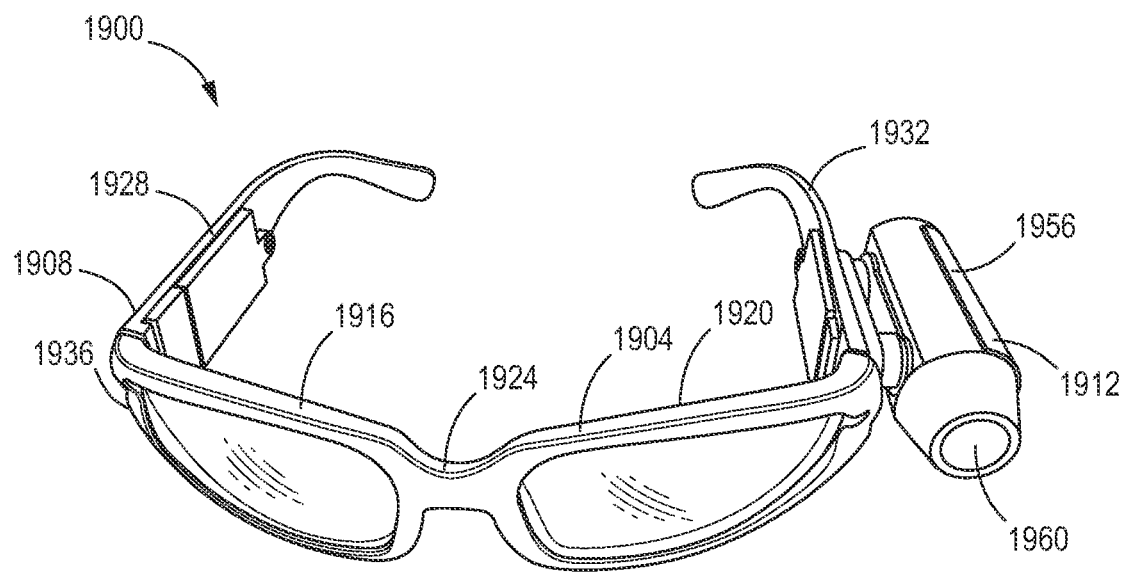
FIG. 36 is a perspective view of a portable eyewear light with a removable light in a connected position.
Figure 37:
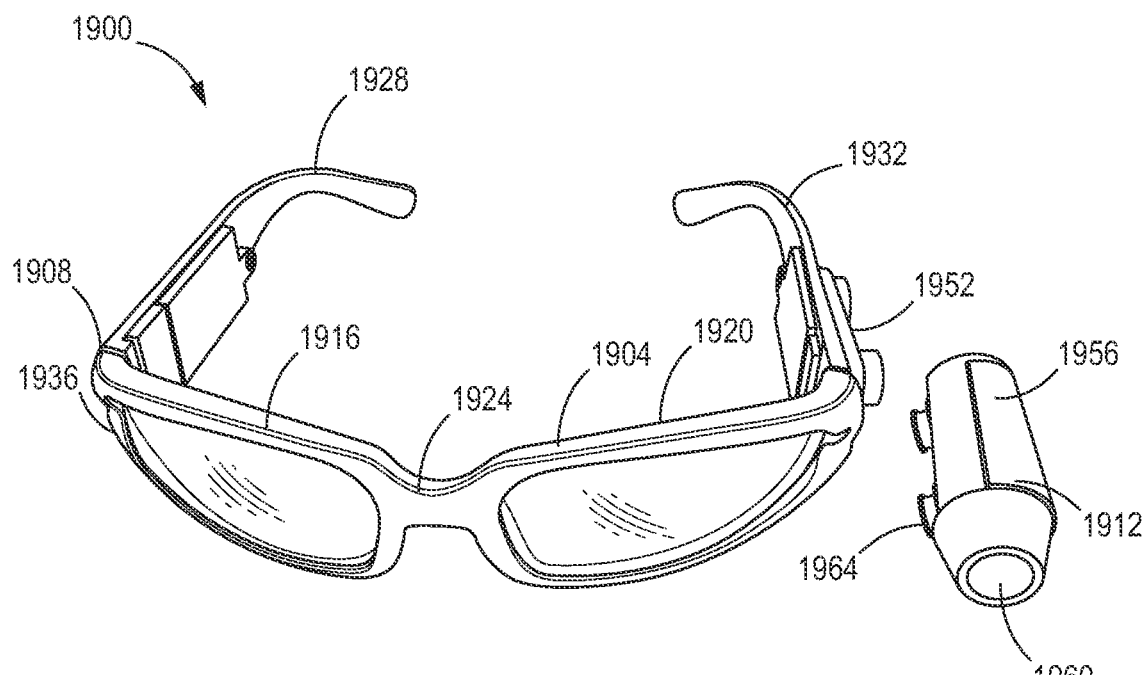
FIG. 37 is a perspective view of the light of FIG. 36 with the removable light in a disconnected position.
Figure 39:
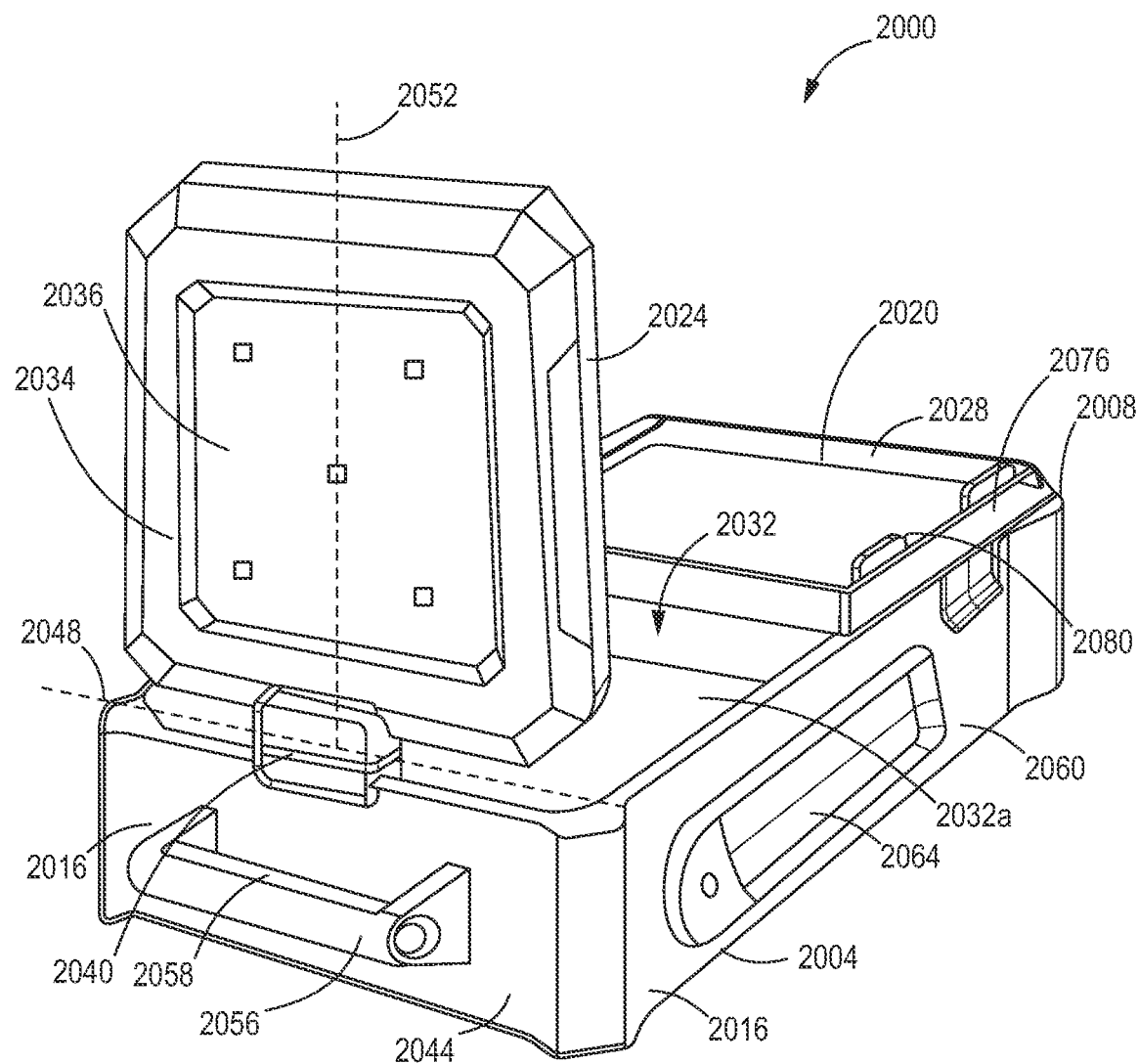
FIG. 39 is a perspective view of a portable box light with a light portion in an open position.
Figure 40:
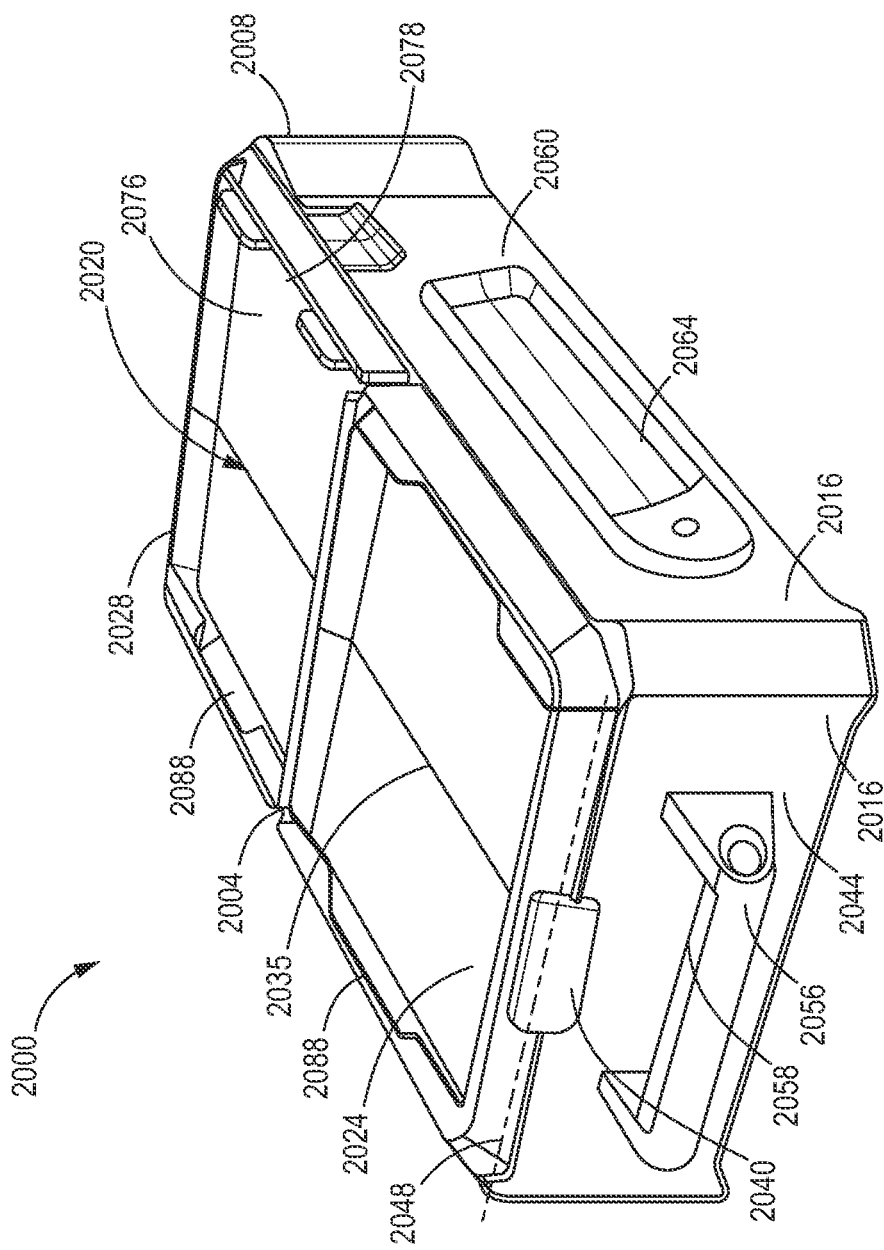
FIG. 40 is a perspective view of the portable box light of FIG. 39 with a light portion in a closed position.
Figure 41A:
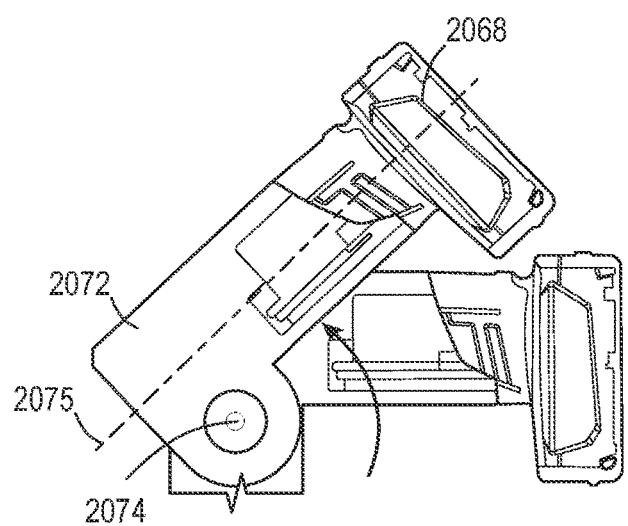
FIG. 41A is a schematic view a battery mount of the portable box light of FIG. 39
Figure 41B:
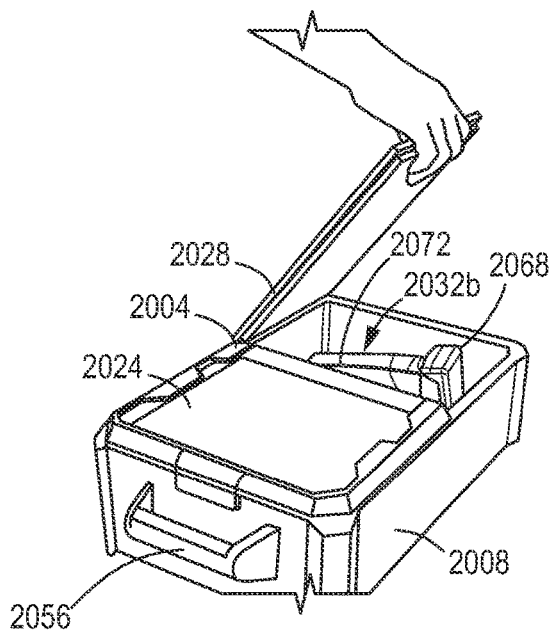
FIG. 41B is a perspective view of the portable box light of FIG. 39 with a cover in an open position and the battery mount in a stored position and a battery connected to the battery mount.
Figure 41C:
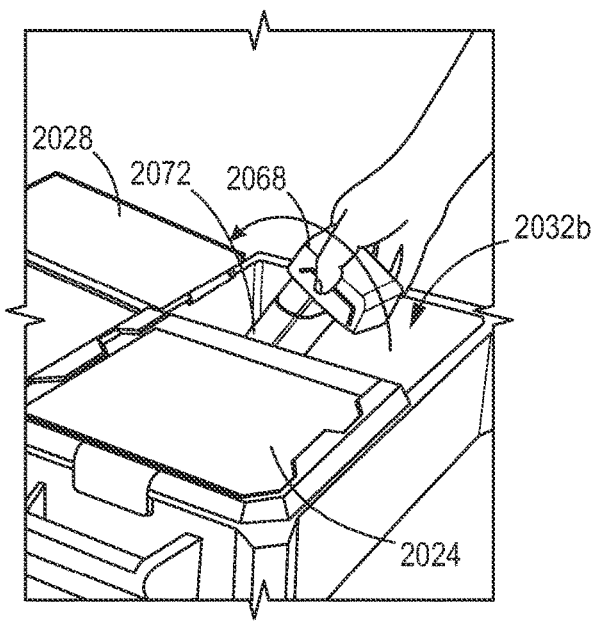
FIG. 41C is a perspective view of the portable box light of FIG. 39 with the cover in the open position and the battery mount in an access position with the battery connected.
Figure 41D:
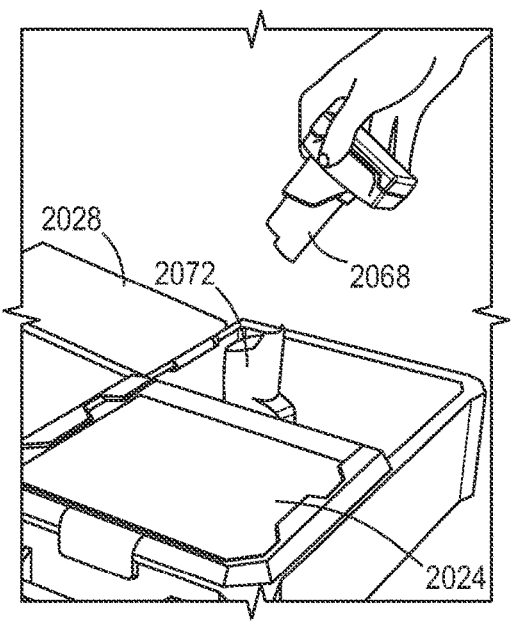
FIG. 41D is a perspective view of the portable box light of FIG. 39 with the cover in the open position and the battery mount in an access position with the battery disconnected.
Figure 42:
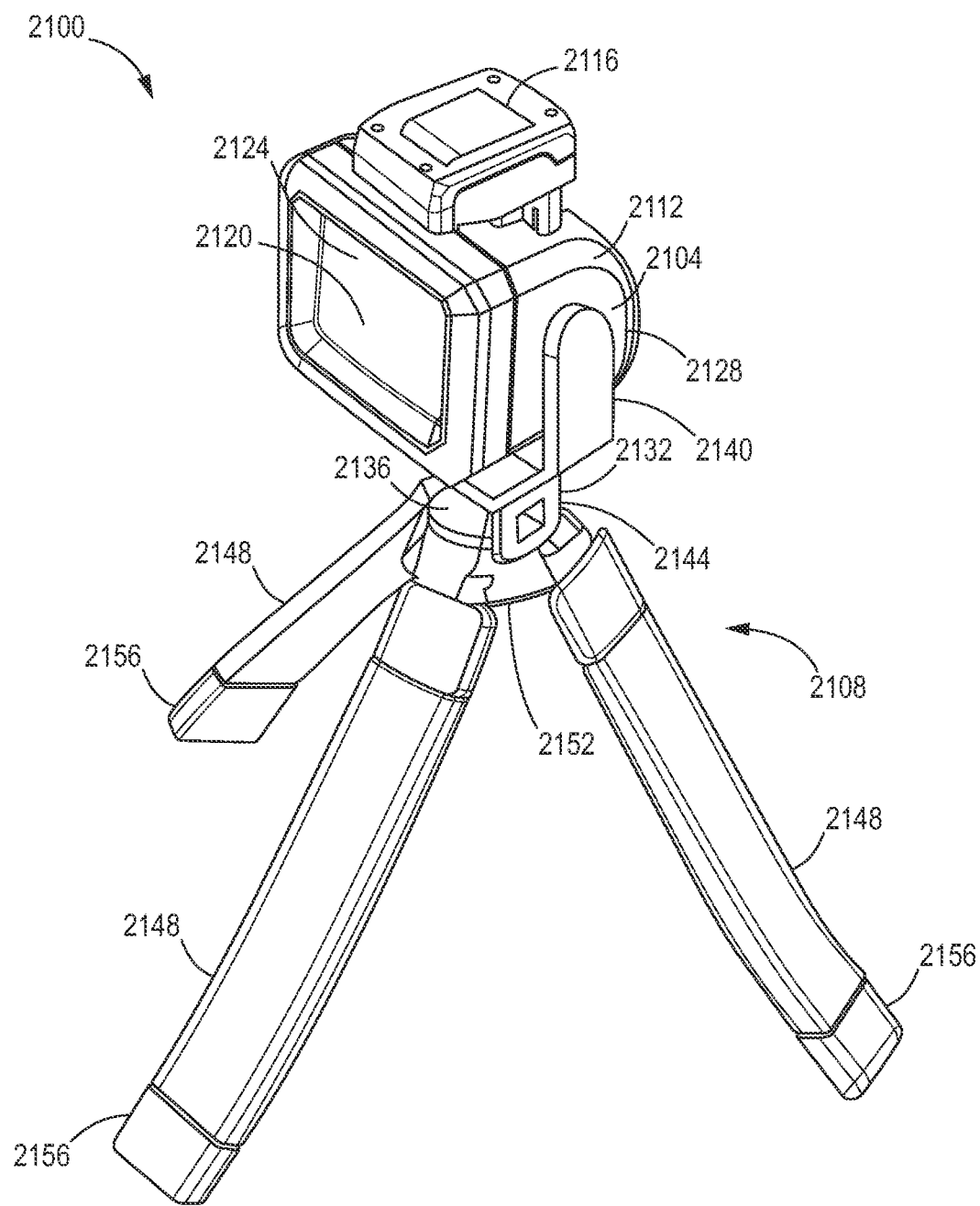
FIG. 42 is a perspective view of a portable lighting system with a first embodiment of a mounting structure having legs in a first position.
Figure 43:
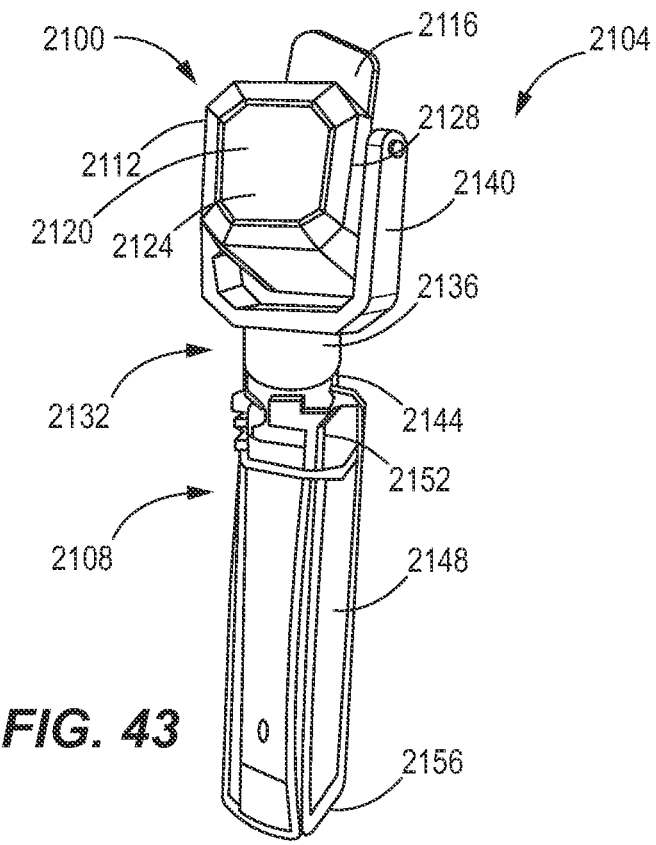
FIG. 43 is a perspective view of the portable lighting system of FIG. 42 with legs in a second position.

FIG. 36-38 illustrate a sixteenth portable lighting system 1900. The lighting system 1900 may include safety glasses 1904, an integrated light 1908, and a removable light 1912. The safety glasses 1904 include a first eyepiece 1916 and a second eyepiece 1920 connected by a bridge 1924. The first eyepiece 1916 may include a first leg 1928 extending from an end opposite the bridge 1924. The second eyepiece 1920 similarly may include a second leg 1932 extending from an end opposite the bridge 1924. The integrated light 1908 may be positioned on the first leg 1928. The integrated light 1908 may include a light source 1936, a rechargeable battery, and a charging port. A switch may be positioned on the first leg 1928 to control operation of the light source 1936. The second leg 1932 may include a magnetic mounting surface 1952. The removable light 1912 may include a housing 1956, a light source 1960 disposed within the housing 1956, and a light magnetic surface 1964. The removable light 1912 may also include a switch positioned on the housing 1956 to control operation of the light source 1960. The removable light 1912 further may include a rechargeable battery and a charging port.

The removable light 1912 may be able to couple to the safety glasses 1904 in a connected state, as shown in FIG. 36, by positioning the light magnetic surface 1964 adjacent the magnetic mounting surface 1952 of the safety glasses 1904. In the connected state, the magnetic connection supports the removable light 1912 on the safety glasses 1904 for hands free support. In some embodiments, other mounting methods are used instead of magnets. In the disconnected state, as shown in FIG. 37, the removable light 1912 may be removed from the safety glasses 1904 by moving the light magnetic surface 1964 away from the magnetic mounting surface 1952 of the safety glasses 1904. In the disconnected state the removable light 1912 may be held by a user and may be used to provide closer and more direct illumination.

FIGS. 38A-38G illustrate various configurations of the lighting system 1900. The configurations are shown in no particular order, are not intended to be limiting, and may be performed as needed. FIG. 38A illustrates a user wearing the safety glasses 1904 with the removable light 1912 in the connected state. Neither the integrated light 1908 nor the removable light 1912 are illuminated. FIG. 38B illustrates the system 1900 with the removable light 1912 in the connected position and illuminated. FIG. 38C shows the system 1900 with both the removable light 1912 and the integrated light 1908 illuminated. The removable light 1912 may be still in the connected position. FIG. 38D illustrates the removable light 1912 being removed from the safety glasses 1904. Both the integrated light 1908 and the removable light 1912 are illuminated. FIG. 38E illustrates the removable light 1912 in the disconnected position with the user operating the removable light 1912 to inspect an area using the additional light. FIG. 38F illustrates the user reconnecting the removable light 1912. Both the integrated light 1908 and the removable light 1912 are illuminated. FIG. 38G illustrates the safety glasses 1904 with the removable light 1912 in the connected position. Both the integrated light 1908 and the removable light 1912 are illuminated. The lighting system 1900 provides easy hands-free lighting with the option of quickly and efficiently employing direct illumination by using the removable light 1912 as a flash light when needed.

FIGS. 39-41D illustrate a seventeenth portable lighting system 2000. The lighting system 2000 is similar to the fourteenth portable lighting system 1500. The lighting system 2000 may include a case 2004 having a housing 2008 including a lower surface 2012, one or more side walls 2016 extending from the lower surface 2012, and an upper surface 2020. The front surface 2020 may include a light body 2024 and a cover 2028, each positioned to partially enclose a cavity 2032 (or receiving area 2032) defined by the housing 2008. The cavity 2032 may include a first space 2032*a* and a second space 2032*b*. The light body 2024 may selectively enclose the first space 2032*a*, and the cover 2028 may selectively enclose the second space 2032*b*. The cover 2028 may be pivotally connected to the housing 2028 between a closed position (FIG. 40), in which the cover 2028 encloses the second space 2032*b*, and an open position (FIG. 41B), in which the cover 2028 allows access to the second space 2032*b*. In some embodiments, the first space 2032*a* and second space 2032*b* may be separated by a partition wall. In other embodiments, the first space 2032*a* and second space 2032*b* are in communication with each other.

The light body 2024 may be formed as a panel light and may include a front surface 2034 and a rear surface 2035. The light body 2024 may include a light source 2036 positioned adjacent the front surface 2034. The light source 2036 may include an LED panel or other lighting elements. The light source 2036 may illuminate an area forward of the front surface 2034. The light body 2024 is connected to the housing 2008 by a hinge 2040 connected to a first side wall 2044 of the side walls 2016. The hinge 2040 allows the light portion 2024 to rotate about a first axis 2048 (e.g., a horizontal axis as viewed in FIG. 39) extending parallel to the first side wall 2044. The hinge 2040 also allows the light portion 2024 to rotate about a second axis 2052 (e.g., a vertical axis as viewed in FIG. 39) extending along the light body 2024. Specifically, the hinge 2040 is mounted to the first sidewall 2044 for rotation about the first axis 2048, and the light body 2024 is rotatably coupled to the hinge 2040 for rotation about the second axis 2052. The second axis 2052 extends perpendicularly to the first axis 2048. The light body 2024 is movable to a plurality of positions to provide a range of illumination outputs. The light body 2024 is movable to a first position or closed position (FIG. 40) in which the light body 2024 encloses the first space 2032*a*. In the first position, the light body 2024 may be positioned such that the rear surface 2035 of the light body 2024 is exposed. In this position, the front surface 2034 and the light source 2036 point into or face the first space 2032*a*. As such, the light source 2036 may be protected. In the first position, the light body 2024 may be partially received in the first space 2032*a*. The light body 2024 is also movable to a second position in which the light body 2024 allows access to the first space and the front surface 2034 is exposed so that the light source 2036 can illuminate a surrounding area.

In the illustrated embodiment, the first side wall 2044 also includes a handle 2056. In some embodiments, the handle 2056 may be positioned on one of the other sidewalls 2016. In some embodiments the handle 2056 includes a hanging feature 2058 such as a notch, a cutout, or other suitable feature for stabilizing the case 2004 when hung on a hook, beam, or other support. Each of a pair of second side walls 2060 of the plurality of side walls 2016 includes a kickstand leg 2064. The kickstand legs 2064 can be rotated about a pivot point to extend past the lower surface 2012. In some embodiments, the kickstand legs 2064 can extend past the plurality of side walls 2016 and connect, forming a U-shape. In some embodiments, the kickstand legs 2064 can double as a handle and be used for carrying or hanging the lighting system 2000.

As shown in FIGS. 41A-41D, a rechargeable battery 2068 is removably received in the second space 2032b of the cavity 2032. The battery 2068 may be, for example, a rechargeable power tool battery pack and may be used to power the light source 2036 of the light body 2024. The battery 2068 selectively connects to a battery mount 2072 positioned in the second space 2032b. The battery mount 2072 is pivotally mounted in the cavity 2032 for rotation about a pivot axis 2074 or first axis 2074. When the cover 2028 is in the open position, the battery mount 2072 is accessible and can be pivoted to facilitate access by the battery 2068. For example, the illustrated battery 2068 is a tower-style or insertion-style battery pack that connects to the battery mount 2072 along an insertion axis 2075 or second axis 2075. The second axis 2075 extends generally perpendicular to the first axis 2074. The battery mount 2072 is pivotable between a first position, in which the insertion axis 2075 is generally perpendicular to the lower surface 2012 and a second position, in which the insertion axis 2075 is generally parallel to the lower surface 2012. When the battery mount 2072 is in the first position, the battery mount 2072 extends generally upward from the lower surface 2012. In the first position, the battery 2068 can be easily removed from or inserted into the battery mount 2072 without interference from walls 2016 of the housing 2008 that define the cavity 2032. When the battery mount 2072 is in the second position, the battery mount 2072 extends along the lower surface 2012. In the second position, the battery 2068 is generally prevented from traveling along the insertion axis to couple with or uncouple from the battery mount 2072 by the sidewalls 2016 defining the second space 2032b. In the second position, the cover 2028 can moved between the open position and closed position.

As described with respect to the fourteenth portable lighting system 1500, the lighting system 2000 may be part of a stackable modular combination storage and lighting system. The modular storage system may include a plurality of cases configured to mount to each other. The cases may contain integrated devices, such as the lighting system 2000, or the cases may provide storage space for removable contents. Each case may include a primary interface 2076 including a first part 2078 and a second part 2080. The first part 2078 may include a set of projections 2084 extending from the lower surface 2012. The projections may be substantially similar to the projections 1556 described with reference to lighting system 1500. The second part 2080 may include a set of cleats or depressions 2088 such as those positioned on the upper surface 2020 of the housing 2008. Specifically, the depressions 2088 may be positioned on the rear surface 2035 of the light body 2024 and on the cover 2028. The first part 2078 and second part 2080 of the primary interface 2076 have a complementary configuration to each other.

The case 2004 may be removably coupled to a second case, identical to the first case, including a complementary interface. The complementary or secondary interface identical to the primary interface. Thus, the secondary interface has a complementary configuration to the first case so that it can couple to the first case in multiple ways. The secondary interface may include a set of second depressions and a set of second projections. The set of second depressions has a complementary configuration to the set of projections 2084 to couple the second case to the first case 2004 adjacent the lower surface 2012. The set of second projections have a complementary configuration to the set of depressions 2088 to couple the second case to the first case 2004 adjacent the upper surface 2020. The lighting system 2000 may be therefore easily transportable as part of the stackable modular storage system.

FIGS. 42-48 illustrate an eighteenth portable lighting system 2100. The portable lighting system 2100 may include a light head 2104 and a mounting structure 2108. The light head 2104 may include a light body 2112 containing a power source 2116 and a light source 2120. The power source 2116 may be a removable, rechargeable battery. The light body 2112 includes a front surface 2124 and a pair of side surfaces 2128. The light source 2120 is positioned adjacent the front surface 2124 to project light in a forward direction. The light head 2104 further includes a connection joint 2132 having an upper portion 2136 including a pair of supports 2140 pivotally connected to the pair of side surfaces 2128, and a lower portion 2144 configured to connect to the mounting portion 2108. The upper portion 2136 and lower portion 2144 are designed to rotate coaxially to provide a first degree of motion. The light body 2112 is configured to rotate with respect to the pair of legs 2140 to provide a second degree of motion. The connection joint 2132 may include a magnet (not shown) for positioning the light head 2104.

Figure 44:
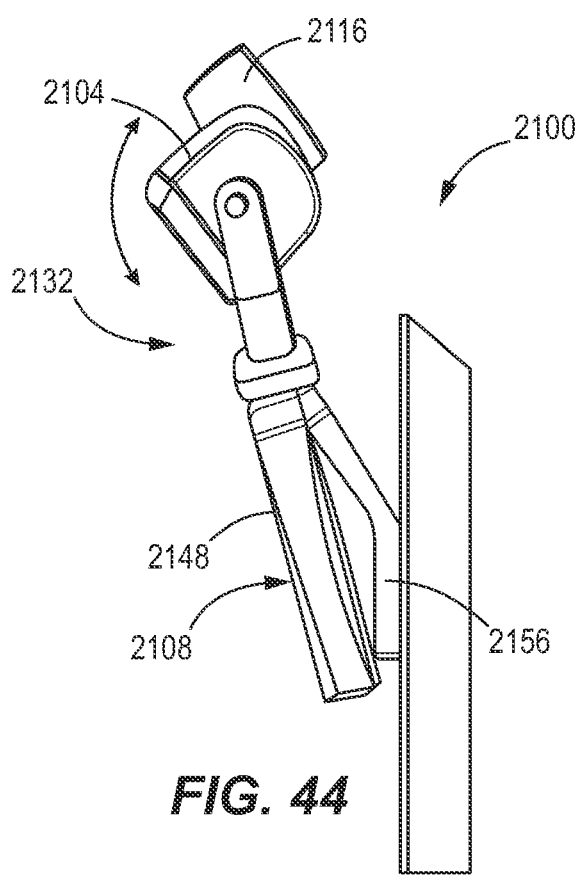
FIG. 44 is a perspective view of the portable lighting system of FIG. 42 mounted on a wall.

The connection joint 2132 removably attaches to the mounting structure 2108. The mounting structure 2108 may include a set of legs 2148 connected to a hub 2152 which is selectively coupled with the lower portion 2144 of the connection joint 2132. In the illustrated embodiment, the set of legs 2148 includes three legs 2148. The legs 2148 are pliable and may be formed into a shape and may hold that shape until formed again. Each of the legs 2148 includes a magnetic end 2156, remote from the hub 2152. The mounting structure 2108 is used to position the light head 2104 in a variety of situations. The legs 2148 may be positioned in many positions including a tripod position (FIG. 42), to support the lighting system 2100 on a flat surface, and a closed position (FIG. 43), where all the legs 2148 are disposed adjacent each other and secured together by the magnetic ends 2156. The legs 2148 may further be positioned to wrap around an elevated object to hang the lighting system 2100 from the object to provide elevated illumination. The legs 2148 may also be used to secure the lighting system 2100 to a wall using the magnetic ends 2156 (FIG. 44).

Figure 45:
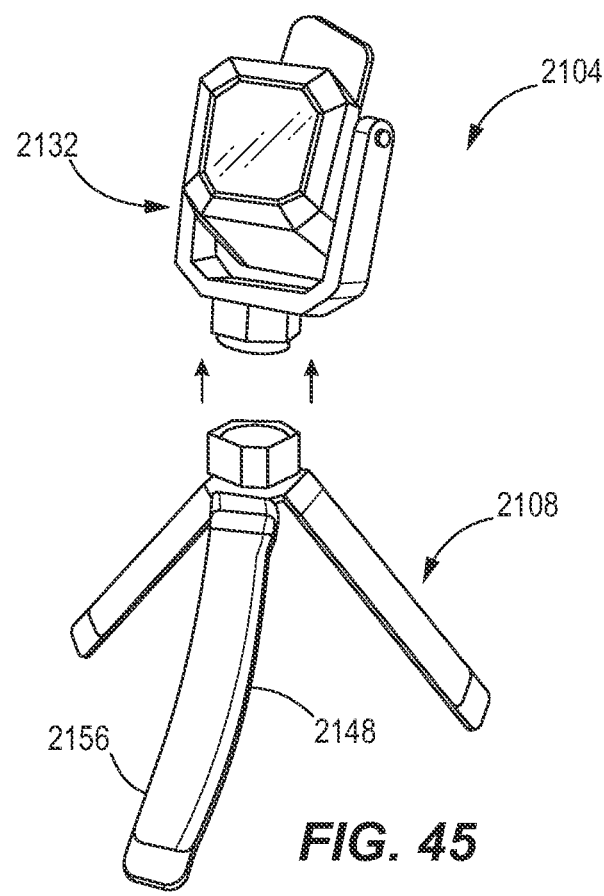
FIG. 45 is a perspective view of the portable lighting system of FIG. 42 with a light head disconnected from the first embodiment of the mounting structure.
Figure 46:
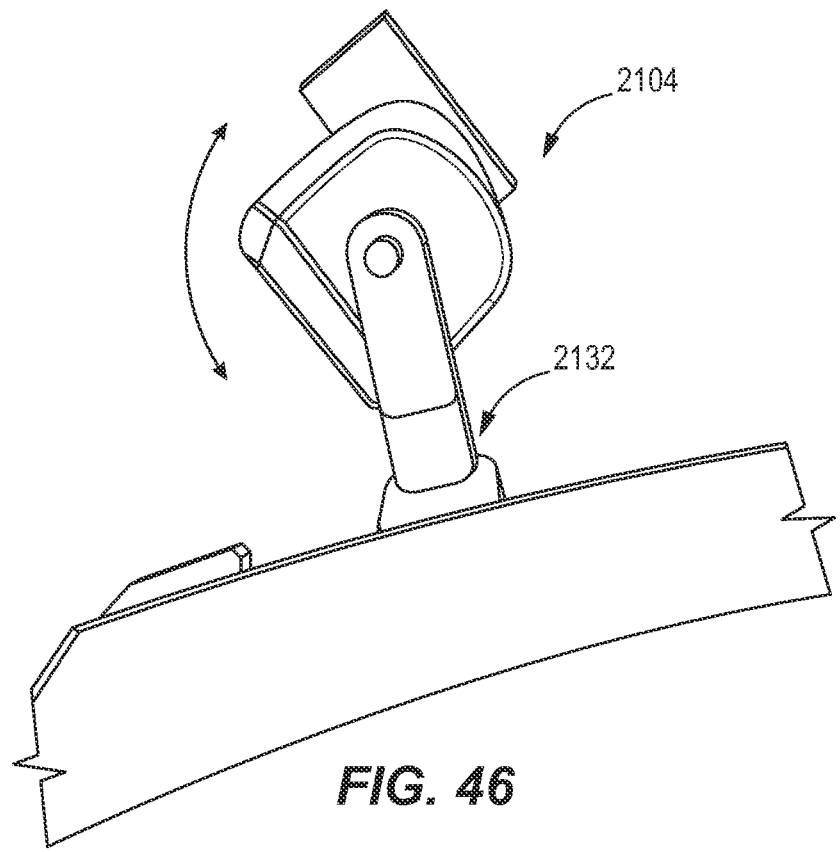
FIG. 46 is a perspective view of the light head of the portable lighting system of FIG. 42 mounted to a wall.

As illustrated in FIG. 45, the light head 2104 is removably coupled to the mounting structure 2108 and can be mounted to different mounting structures or mounted directly to a surface by the magnet (FIG. 46). When mounted directly to a surface, the light body 2112 can still rotate with respect to the pair of legs 2140 of the connection joint 2132, allowing light from the light source 2120 to be directed toward a working area.

Figure 47:
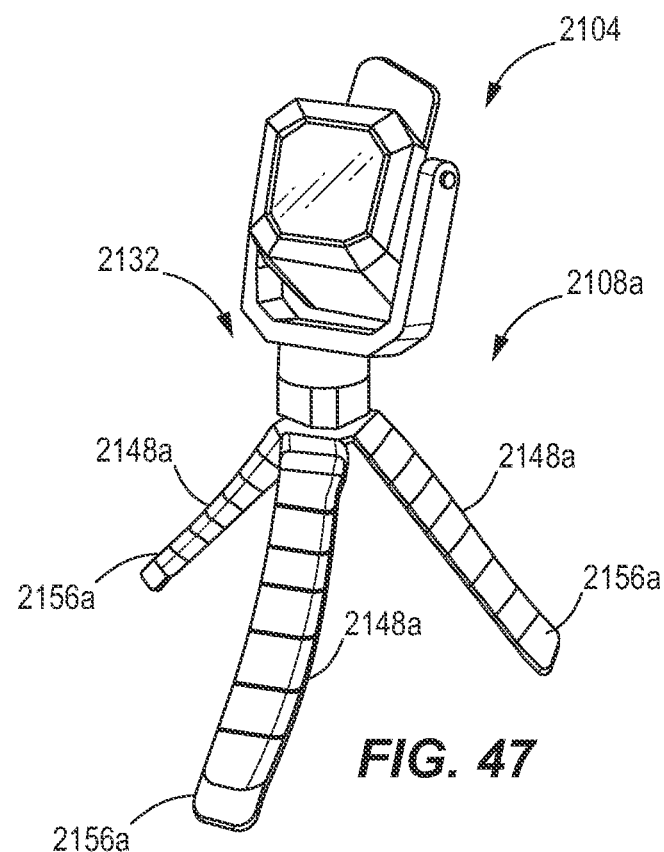
FIG. 47 is a perspective view of a portable lighting system of FIG. 42 with a second embodiment of a mounting structure.
Figure 48:
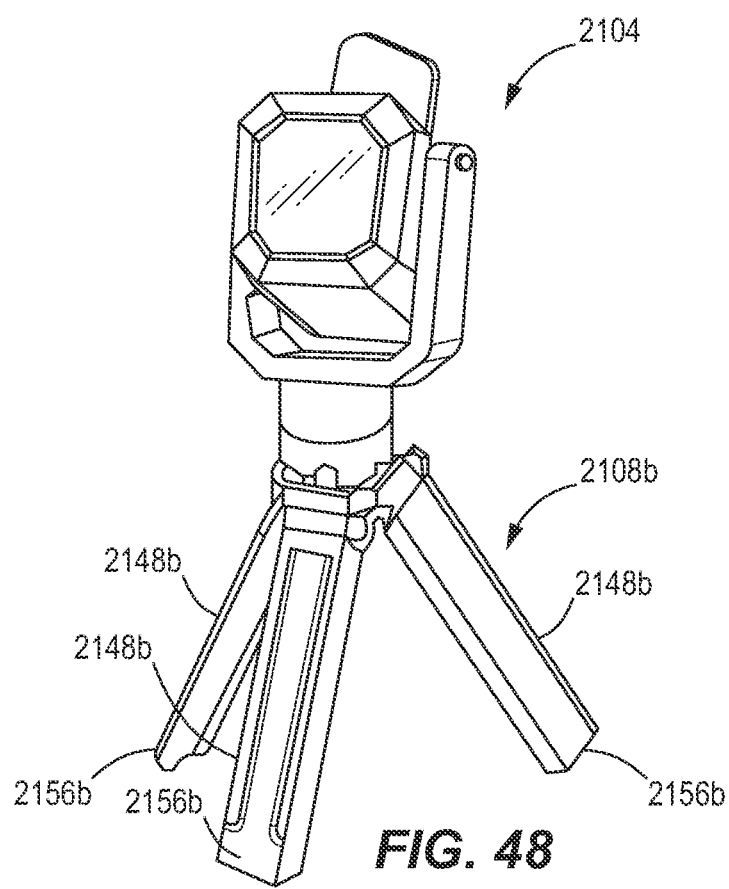
FIG. 48 is a perspective view of a portable lighting system of FIG. 42 with a third embodiment of a mounting structure.
Figure 49:
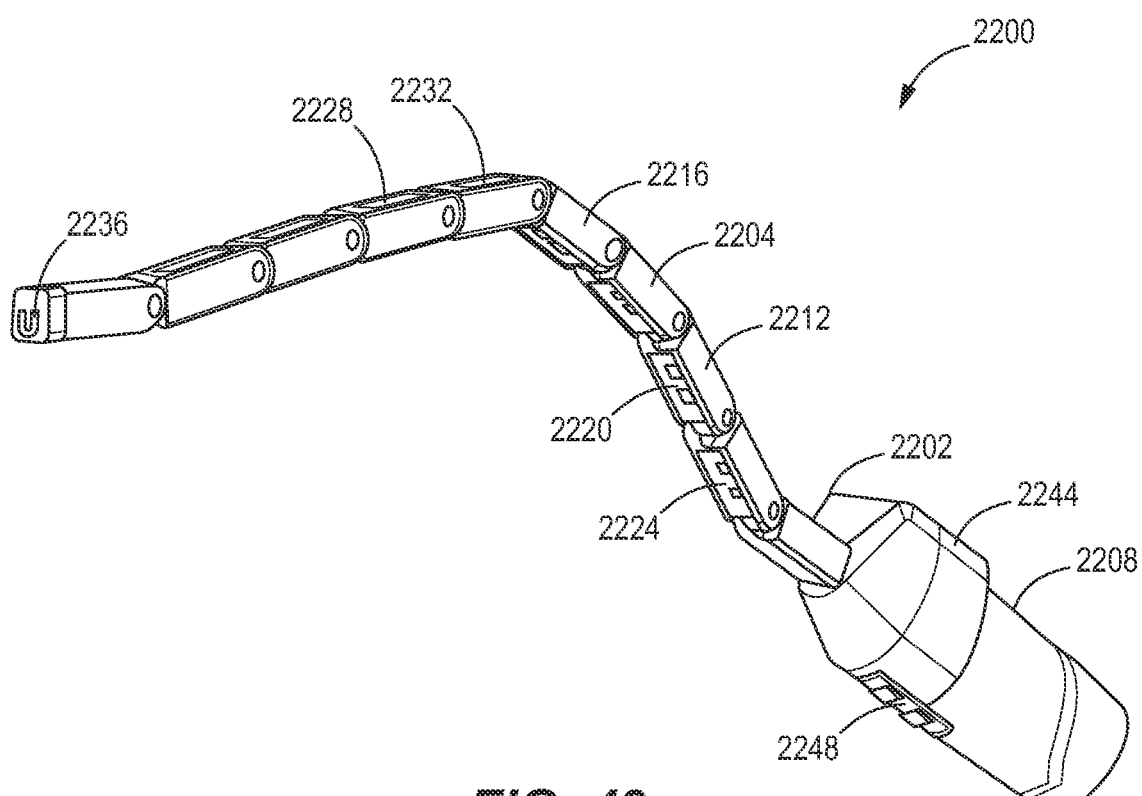
FIG. 49 is a perspective view of a portable rope light.

With reference to FIGS. 47-48, the light system 2100 may include a plurality of mounting structures 2108 alternately couplable with the light head 2104. A user can select a mounting structure 2108 to couple to the light head 2104 based on the environment or task or can select a mounting structure 2108 based on personal preference. The light system 2100 may include additional mounting structures not described herein with different properties. FIG. 47 illustrates a second embodiment of a mounting structure 2108a including legs 2148a which are segmented. The segmented legs 2148a are flexible and can be positioned in plurality of positions including a tripod position, as shown, and a closed position. The segmented legs 2148a include magnetic ends 2156a which can be used to mount the lighting system 2100, for example, to a wall. The segmented legs 2148a can also be wrapped around an object or otherwise positioned to retain form and support the light head 2104. FIG. 48 illustrates a third embodiment of a mounting structure 2108b including legs 2148b which are rigid. The legs 2148b are still movable to a plurality of positions including a tripod position, as shown, and a closed position. The legs 2148b include magnetic ends 2156b, which can be used to mount the lighting system 2100, for example, to a wall.

The lighting system 2100 may be used to provide light in a workspace. The lighting system 2100 may be sized to be easily stored and transported. The connection joint 2132 and the legs 2148 allow the light from the light source 2120 to be positioned and directed as needed in a variety of environments and workspaces.

FIGS. 49-55 illustrate a nineteenth portable lighting system 2200. The portable lighting system 2200 has a rope light 2202 including a light body 2204 and a base 2208. The light body 2204 is coupled to and extends from a first end of the base 2208. The base 2208 defines a grip that can be held by a user to operate the rope light 2202.

The light body 2204 includes a light strand 2216. The light strand 2216 may include plurality of segments 2212. The segments 2212 are hinged together such that each segment 2212 is independently pivotable relative to its adjacent segments 2212. Each segment 2212 includes a first face 2220 with a first light source 2224 and a second face 2228 with a second light source 2232. In some embodiments, each segment 2212 may only include one light source. Each segment 2212 may be connected to the adjacent segment 2212 by a joint 2234. The joint 2234 may be reinforced to allow for rotation when adjusted but remain in the selected position and support a portion the weight of the light strand 2216. The segments 2212 are generally equally shaped and sized. In the illustrated embodiment, the light strand 2216 includes eight segments 2212. In other embodiments, the light strand 2216 may include fewer or more segments 2212, and/or the segments 2212 may have other shapes or sizes.

Figure 50:
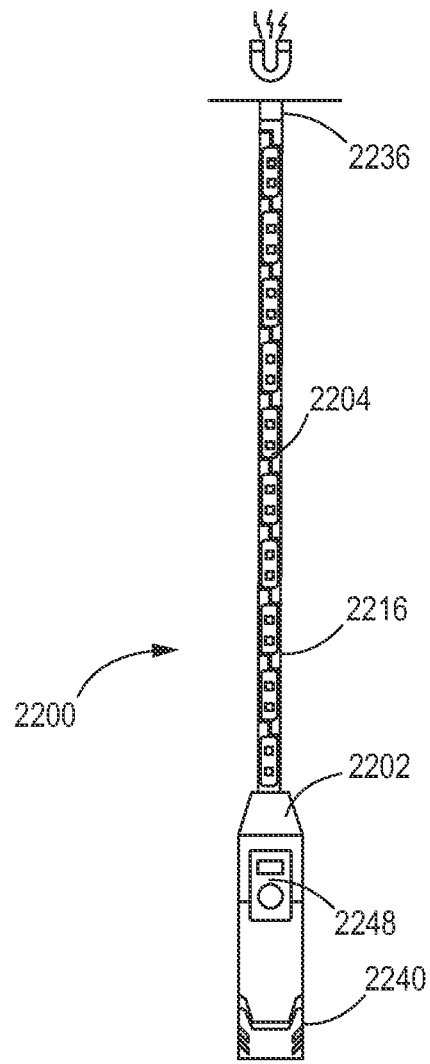
FIG. 50 is a front view of the portable rope light of FIG. 49 mounted in a first configuration.
Figure 51:
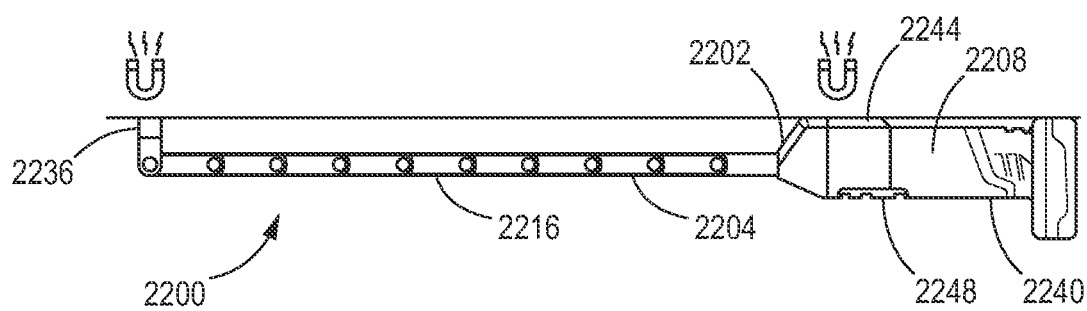
FIG. 51 is a side view of the portable rope light of FIG. 49 mounted in a second configuration.

The light strand 2216 includes a magnetic end 2236 which may be used for mounting the lighting system 2200. The magnetic end 2236 is pivotally coupled to a distal-most segment 2212 of the light strand 2216. The base 2208 may include a removable rechargeable battery 2240. The battery 2240 is coupled to a second end of the base 2208 opposite from the light head 2204. The base 2208 may further include a magnetic surface 2244 opposite a user interface control 2248. The user interface control 2248 can be used to control the light output of the light strand 2216. As shown in FIG. 50, the rope light 2202 can be mounted by just the magnetic end 2236 of the light strand 2216, creating a drop light configuration. As shown in FIG. 51, the rope light 2202 can also be mounted flush with a surface using both the magnetic end 2236 and the magnetic surface 2244 of the base 2208.

Figure 52:
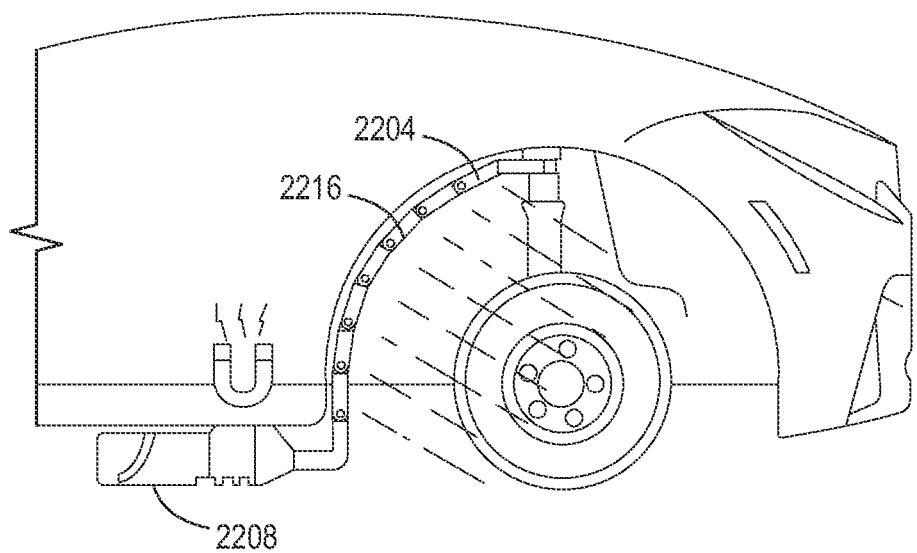
FIG. 52 is a schematic view of the portable rope light of FIG. 49 in a first use situation.
Figure 53:
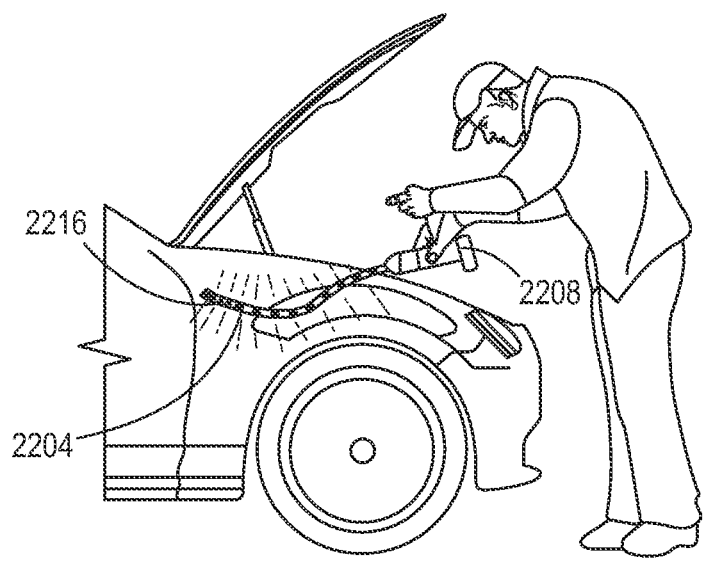
FIG. 53 is a schematic view of the portable rope light of FIG. 49 in a second use situation.
Figure 54:
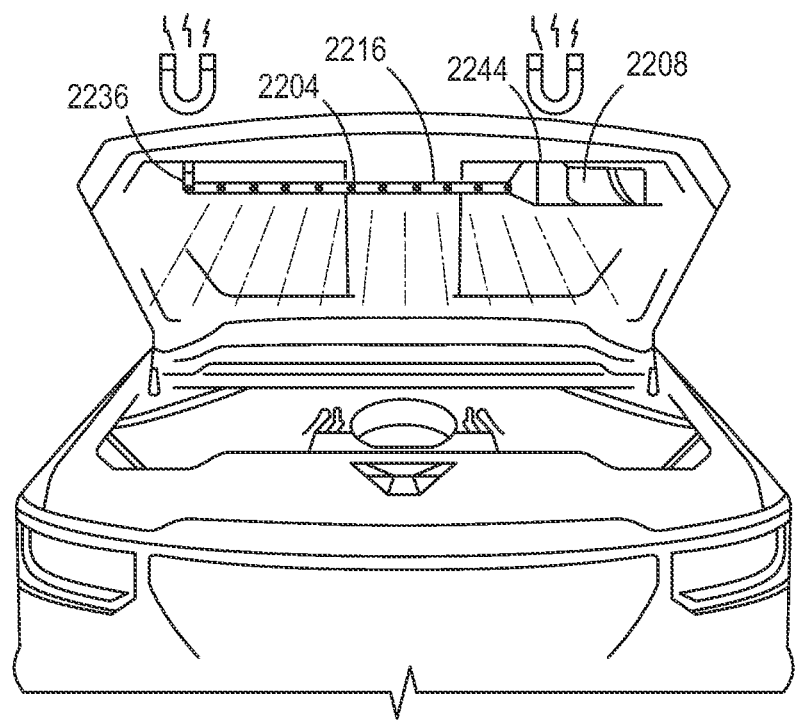
FIG. 54 is a schematic view of the portable rope light of FIG. 49 in a third use situation.

FIGS. 52-55 illustrate a variety of uses for the lighting system 2200. The light strand 2216 can be positioned to create a desired illumination output based on the environment and the task. As shown in FIG. 52, the light strand 2216 may be shaped to conform to various surfaces, such as a wheel well. As shown in FIG. 53, the light strand 2216 may be formed to fish through crowded workspaces, such as an engine bay. As shown in FIG. 54, the rope light 2202 can be flush mounted using the magnetic end 2236 and the magnetic surface 2244 to illuminate a work area, such as under the hood of a car. As shown in FIG. 55, the magnetic end 2236 can also be used to secure magnetic objects to the end. This can be used to retrieve fallen objects or store objects for later use or convenient access.

The lighting system 2200 provides adjustable illumination for tight spaces and is lightweight and easily transported to a workspace. The light strand 2216 may be shaped to provide a specific illumination output. The rope light 2202 may be positioned and mounted using the magnetic surfaces 2244, 2236. The light strand 2216 may be shaped before or after the rope light 2202 has been mounted. The user interface control 2248 may be operated to provide illumination to the workspace. The lighting system 2200 provides a portable and adjustable illumination solution for tight spaces.

Although aspects have been described in detail with reference to certain embodiments, variations and modifications exist within the scope of one or more independent aspects as described. Especially, the features discussed with reference to one embodiment of a system may be included in another embodiment and the features discussed with reference to one system may be applied to another system.

What is claimed is:

1. A portable lighting system comprising:
  a housing including:
    a lower surface,
    walls extending from the lower surface, and
    a cavity defined by the lower surface and the walls, the cavity being divided into a first space and a second space;
  a light body coupled to the housing for movement between a first position, in which the light body encloses the first space, and a second position, in which the light body allows access to the first space; and
  a battery removably received in the second space.

2. The portable lighting system of claim 1, further comprising a hinge pivotably coupling the light body to the housing for rotation about a first axis.

3. The portable lighting system of claim 2, wherein the light body is rotatably coupled to the hinge for rotation about a second axis perpendicular to the first axis.

4. The portable lighting system of claim 1, further comprising a cover pivotably coupled to the housing for movement between a closed position, in which the cover encloses the second space, and an open position, in which the cover allows access to the second space.

5. The portable lighting system of claim 1, wherein the lower surface includes a set of projections extending away from the lower surface, and wherein the housing is configured to be coupled to another structure having a set of depressions that is complementary to the set of projections.

6. The portable lighting system of claim 5, wherein the light body is a panel light including a front face, a rear face, and a light source operable to emit light from the front face, and wherein the rear face includes a second set of depressions that have a complementary configuration to the set of projections.

7. The portable lighting system of claim 5, further comprising a cover selectively coupled to the housing, wherein the cover includes a second set of depressions that have a complementary configuration to the set of projections.

8. The portable lighting system of claim 1, wherein the light body is a panel light including a front face, a rear face, and a light source operable to emit light from the front face, and wherein the front face faces into the first space when the light body is in the first position.

* * * * *